(12) United States Patent
Rih et al.

(10) Patent No.: US 12,090,721 B2
(45) Date of Patent: Sep. 17, 2024

(54) METHOD FOR PRODUCING A THREADLIKE REINFORCEMENT ELEMENT

(71) Applicant: COMPAGNIE GENERALE DES ETABLISSEMENTS MICHELIN, Clermont-Ferrand (FR)

(72) Inventors: Sabrina Rih, Clermont-Ferrand (FR); Richard Cornille, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 590 days.

(21) Appl. No.: 16/956,909

(22) PCT Filed: Dec. 13, 2018

(86) PCT No.: PCT/FR2018/053273
§ 371 (c)(1),
(2) Date: Jun. 22, 2020

(87) PCT Pub. No.: WO2019/122621
PCT Pub. Date: Jun. 27, 2019

(65) Prior Publication Data
US 2021/0053307 A1 Feb. 25, 2021

(30) Foreign Application Priority Data
Dec. 22, 2017 (FR) ...................................... 1763117

(51) Int. Cl.
*B29D 30/40* (2006.01)
*B29D 30/38* (2006.01)
(Continued)

(52) U.S. Cl.
CPC ............ *B29D 30/40* (2013.01); *B60C 9/0042* (2013.01); *B60C 9/0064* (2013.01); *D02G 3/02* (2013.01);
(Continued)

(58) Field of Classification Search
CPC .... B29D 30/40; B29D 9/0042; B29D 9/0064; B29D 30/38; B29D 2030/383;
(Continued)

(56) References Cited

U.S. PATENT DOCUMENTS

| 3,327,753 A | 6/1967 | Travers |
| 3,495,646 A * | 2/1970 | Marzocchi .............. E04C 5/073 57/229 |

(Continued)

FOREIGN PATENT DOCUMENTS

| EP | 0133205 A1 | 2/1985 |
| EP | 0310171 A2 | 4/1989 |

(Continued)

OTHER PUBLICATIONS

International Search Report dated Mar. 11, 2019, in corresponding PCT/FR2018/053273 (6 pages).

*Primary Examiner* — Camie S Thompson
(74) *Attorney, Agent, or Firm* — VENABLE LLP

(57) ABSTRACT

A method for manufacturing a bonded reinforcing textile filamentary element (48) comprising a core and a layer of strands is disclosed. The textile filamentary element in the natural state is assembled. A textile filamentary element in the natural state or pre-bonded textile filamentary element is obtained. The filamentary element in the natural state or pre-bonded filamentary element is coated with an external layer of at least one heat-crosslinkable adhesive composition. The filamentary element in the natural state or pre-bonded filamentary element that is coated with the external (Continued)

layer is thermally treated so as to crosslink the adhesive composition in order to obtain the bonded filamentary element (48). The steps of coating with and of thermally treating the external layer of the filamentary element in the natural state or pre-bonded filamentary element are carried out such that, for an elongation equal to 30% of the elongation at break of the filamentary element in the natural state, the tangent modulus of the bonded reinforcing textile filamentary element (48) is increased compared with the tangent modulus of the filamentary element in the natural state.

13 Claims, 3 Drawing Sheets

(51) Int. Cl.
| | | |
|---|---|---|
| *B60C 9/00* | (2006.01) | |
| *D02G 3/02* | (2006.01) | |
| *D02G 3/40* | (2006.01) | |
| *D02G 3/48* | (2006.01) | |
| *D06M 15/693* | (2006.01) | |
| *D06M 101/32* | (2006.01) | |
| *D06M 101/34* | (2006.01) | |

(52) U.S. Cl.
CPC ............... *D02G 3/404* (2013.01); *D02G 3/48* (2013.01); *D06M 15/693* (2013.01); *B29D 2030/383* (2013.01); *B60C 2009/0078* (2013.01); *D06M 2101/32* (2013.01); *D06M 2101/34* (2013.01); *D10B 2331/02* (2013.01); *D10B 2331/04* (2013.01); *D10B 2505/022* (2013.01)

(58) Field of Classification Search
CPC ............... B60C 9/0042; B60C 9/0064; B60C 2009/0078; D02G 3/02; D02G 3/404; D02G 3/489; D02G 3/48; D06M 15/693; D06M 2101/32; D06M 2101/34; D01B 15/002; D10B 2331/02; D10B 2331/021; D10B 2331/04; D10B 2505/022
USPC ...................................................... 156/110.1
See application file for complete search history.

(56) References Cited

U.S. PATENT DOCUMENTS

| | | |
|---|---|---|
| 3,938,313 A | 2/1976 | Marzocchi |
| 4,499,716 A | 2/1985 | Antal et al. |
| 6,093,490 A | 7/2000 | Meraldi et al. |
| 6,261,689 B1 | 7/2001 | Meraldi et al. |
| 6,799,618 B2 | 10/2004 | Reuter et al. |
| 6,818,728 B2 | 11/2004 | Kato et al. |
| 6,881,478 B2 | 4/2005 | Kato et al. |
| 7,222,481 B2 | 5/2007 | Esnault et al. |
| 2003/0026981 A1 | 2/2003 | Kato et al. |
| 2004/0265581 A1 | 12/2004 | Esnault et al. |
| 2005/0031864 A1 | 2/2005 | Kato et al. |
| 2006/0027310 A1 | 2/2006 | Auclair |
| 2007/0017620 A1 | 1/2007 | Donckels et al. |
| 2007/0148454 A1 | 6/2007 | Jerome, Jr. |
| 2007/0169867 A1 | 7/2007 | Esnault et al. |
| 2009/0266462 A1 | 10/2009 | Yamamoto et al. |
| 2010/0224298 A1 | 9/2010 | Rampana et al. |
| 2013/0042593 A1 | 2/2013 | Rampana et al. |
| 2013/0146198 A1 | 6/2013 | Chang et al. |
| 2016/0152083 A1 | 6/2016 | Foucher |
| 2016/0303914 A1 | 10/2016 | Foucher |
| 2018/0117970 A1 | 5/2018 | Le Clerc et al. |

FOREIGN PATENT DOCUMENTS

| | | | |
|---|---|---|---|
| EP | 0456306 | A1 | 11/1991 |
| EP | 1623819 | A1 | 2/2006 |
| EP | 1925467 | A1 | 5/2008 |
| FR | 1413102 | | 8/1965 |
| KR | 1020140024508 | * | 3/2014 |
| WO | 97/06294 | A1 | 2/1997 |
| WO | 02/068738 | A1 | 9/2002 |
| WO | 03/060212 | A1 | 7/2003 |
| WO | 2009/052844 | A1 | 4/2009 |
| WO | 2016/166056 | A1 | 10/2016 |

* cited by examiner

METHOD FOR PRODUCING A THREADLIKE REINFORCEMENT ELEMENT

BACKGROUND

The invention relates to tyres and preferably those for passenger vehicles, but can be used on any other type of vehicle, such as two-wheeled vehicles, heavy-duty vehicles, agricultural vehicles, construction plant vehicles or aircraft or, more generally, on any rolling device. A tyre is understood to mean a casing intended to form a cavity by cooperating with a support element, for example a rim, this cavity being able to be pressurized to a pressure higher than atmospheric pressure. A tyre according to the invention has a structure of substantially toroidal shape.

Tyres comprising a crown and two sidewalls are known from the prior art. Those tyres conventionally comprise a carcass reinforcement that is anchored in two beads and surmounted radially by a crown reinforcement that is itself surmounted radially by a tread, the crown reinforcement being joined to said beads by the two sidewalls. The carcass reinforcement comprises a single carcass ply comprising carcass reinforcing filamentary elements. The crown reinforcement comprises a working reinforcement comprising two working plies comprising working reinforcing filamentary elements, the working reinforcing filamentary elements of the two plies making angles with the circumferential direction of the tyre that have opposite orientations from one working ply to the other. The crown reinforcement likewise comprises a hoop reinforcement comprising a single hooping ply comprising hoop reinforcing textile filamentary elements.

The carcass reinforcing filamentary elements and working reinforcing filamentary elements are arranged so as to define, in the crown, a triangle mesh.

On the one hand, the hoop reinforcement has to make it possible, by virtue of suitable mechanical strength properties in the cured state, to exert a sufficient hooping force at the crown of the tyre, in particular when rolling at high speeds, in order to ensure that the profile of the tyre is maintained. On the other hand, the hoop reinforcement has to allow, by virtue of suitable tensile modulus properties in the uncured state, a radial expansion and thus circumferential elongation of the crown of the tyre so as not to prevent the radial and circumferential deformations imposed on the tyre while it is being manufactured, in particular during the curing of the tyre, during which the tyre is expanded radially and circumferentially, for example by pressurization of an inflating membrane, so as to be pressed against the surfaces of the curing mould.

Such a tyre is described in particular in U.S. Pat. No. 6,799,618. On account of the presence of two working plies, the hooping reinforcing textile filamentary elements have mechanical properties, in particular a tangent modulus, that are relatively low both in the uncured state before the step of manufacturing the hooping ply and in the cured state once removed from the tyre, regardless of the elongation imposed. Thus, the hooping ply in U.S. Pat. No. 6,799,618 ensures that it is possible to deform the tyre radially and circumferentially while it is being manufactured, but by sacrificing the mechanical properties of the hooping ply and thus of the crown reinforcement.

A tyre in which the working reinforcement comprises a single working ply is known from WO2016/166056. In this way, the crown reinforcement of the tyre is lightened. In that tyre, the triangle mesh is brought about by the particular arrangement, in the crown, of the carcass reinforcing filamentary elements, working reinforcing filamentary elements and hooping reinforcing filamentary elements. In WO2016/166056, on account of the elimination of one working ply, the hooping ply comprises hooping reinforcing textile filamentary elements that have a relatively high tangent modulus, both in the uncured state before the step of manufacturing the hooping ply and in the cured state once removed from the tyre, specifically in order to compensate for the elimination of one of the working plies. Thus, such hooping reinforcing textile filamentary elements, although ensuring the mechanical strength properties of the crown, do not confer sufficient endurance on the hoop reinforcement. This endurance is all the more necessary since, in the case of a crown reinforcement that only comprises a single working ply, the hooping ply is intended to provide the crown reinforcement with a part of the endurance lost by the elimination of one of the working plies.

SUMMARY

The aim of the invention is a method for manufacturing a bonded reinforcing textile filamentary element in which it is possible to maximize the endurance and the modulus of the bonded reinforcing textile filamentary element independently of one another.

To this end, one subject of the invention is a method for manufacturing a bonded reinforcing textile filamentary element comprising:
- a core made up of a first strand comprising at least one monofilament, and
- a layer comprising at least two second strands, each second strand of the layer comprising at least one monofilament, each second strand of the layer being wound in a helix around the core, wherein, in said method,
the first strand of the core and the second strands of the layer are assembled so as to form a reinforcing textile filamentary element in the natural state,
the reinforcing filamentary element in the natural state or a pre-bonded reinforcing filamentary element is obtained,
the reinforcing textile filamentary element in the natural state or pre-bonded reinforcing textile filamentary element is coated with an external layer of at least one heat-crosslinkable adhesive composition,
the reinforcing textile filamentary element in the natural state or pre-bonded reinforcing textile filamentary element that is coated with the external layer is thermally treated so as to crosslink the adhesive composition in order to obtain the bonded reinforcing textile filamentary element, wherein, in said method, the steps of coating with and of thermally treating the external layer of the reinforcing textile filamentary element in the natural state or pre-bonded reinforcing textile filamentary element are carried out such that, for an elongation equal to 30% of the elongation at break of the reinforcing textile filamentary element in the natural state, the tangent modulus of the bonded reinforcing textile filamentary element is increased compared with the tangent modulus of the reinforcing textile filamentary element in the natural state.

BRIEF DESCRIPTION OF THE DRAWINGS

The invention will be understood better from reading the following description, which is given solely by way of non-limiting example and with reference to the drawings, in which.

DETAILED DESCRIPTION

Figure 1:
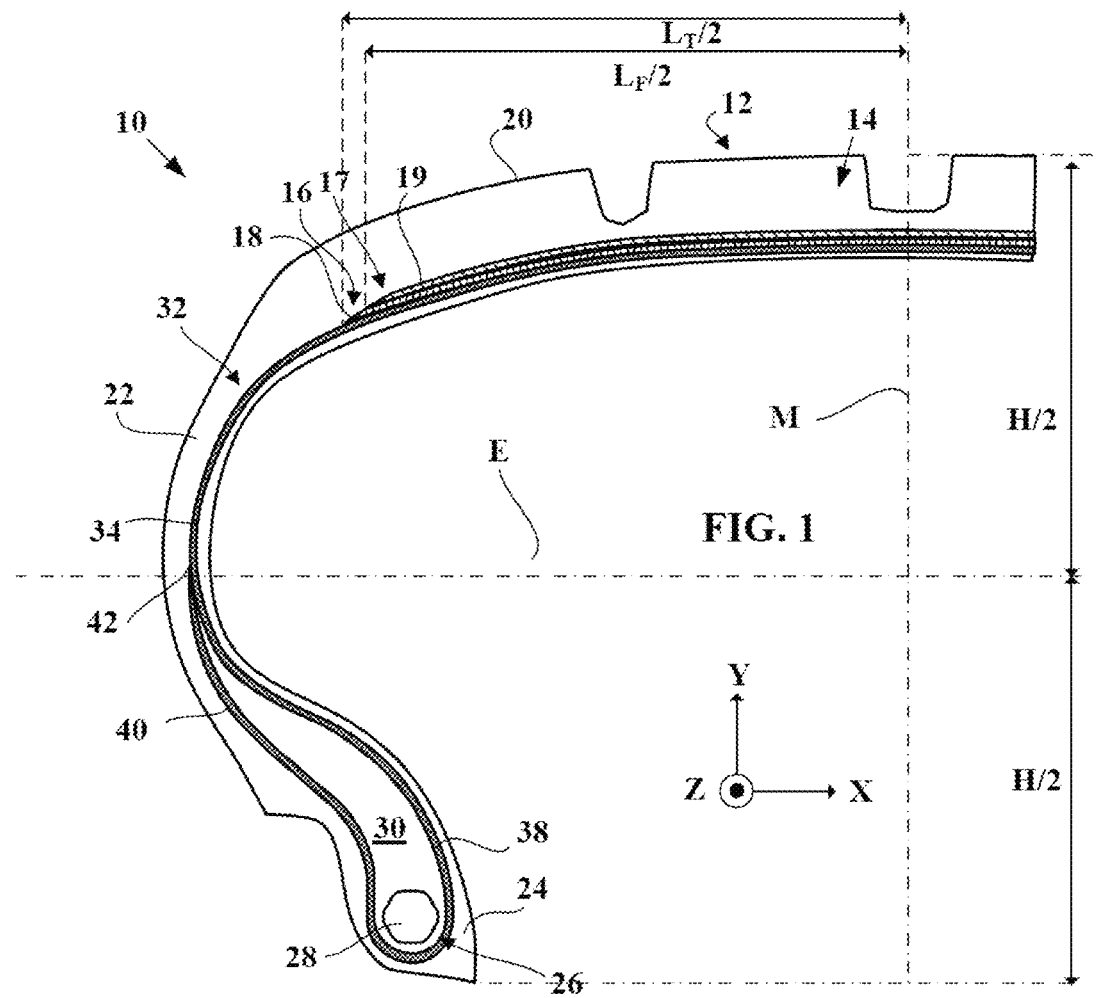
FIG. 1 is a view in cross section perpendicular to the circumferential direction of a tyre according to the invention.

The inventors behind the invention discovered, surprisingly, that, by applying a specific process to a reinforcing filamentary element having a specific structure comprising a core and a layer, it was possible to improve the endurance of the bonded reinforcing filamentary element independently of the variation in the modulus thereof. This is because the specific structure of the filamentary element is such that the lower the tangent modulus of the reinforcing textile filamentary element in the natural state, the better the endurance thereof, independently of the parameters of the steps of coating and thermal treatment applied thereto. Thus, for a given reinforcing textile filamentary element in the natural state, the parameters of the steps of coating and thermal treatment could be varied so as to increase, as desired, the modulus thereof once in the bonded state without risking obtaining a bonded reinforcing textile filamentary element exhibiting poor endurance, the latter being conditioned only by the reinforcing textile filamentary element in the natural state. By contrast, for a bonded reinforcing textile filamentary element that is desired to have a given modulus, it would be possible to start from any reinforcing textile filamentary element in the natural state; the lower the modulus of the reinforcing textile filamentary element in the natural state, the better the endurance of the bonded reinforcing textile filamentary element.

By decreasing the tangent modulus of the bonded reinforcing textile filamentary element compared with the tangent modulus of the reinforcing textile filamentary element in the natural state, not only would a bonded reinforcing textile filamentary element exhibiting a lower modulus than the reinforcing textile filamentary element in the natural state be obtained but especially a lower endurance than if the starting point had been a reinforcing textile filamentary element in the natural state exhibiting a lower modulus and if the modulus had been increased in order to obtain the bonded reinforcing textile filamentary element. In this case, which is not covered by the invention, and contrary to the aim pursued by the invention, neither the modulus nor the endurance would then be maximized.

A textile filamentary element in the natural state is one in which the constituent textile material(s) of the textile filamentary element are manufactured without any coating having an adhesive function covering this or these materials. Thus, a textile filamentary element in the natural state can be bare, meaning that the constituent textile material(s) of the textile filamentary element are not coated with any coating or are possibly sized, that is to say coated with a sizing composition having in particular the functions of facilitating the sliding of the constituent textile material(s) of the textile filamentary element while it is being manufactured and of avoiding the build-up of electrostatic charges.

A pre-bonded textile filamentary element is one in which the constituent textile material(s) of the textile filamentary element are directly coated with an intermediate layer of a composition intended to promote adhesion between the constituent textile material(s) of the textile filamentary element and an external layer of a composition which, for its part, is intended to ensure adhesion between the pre-bonded textile filamentary element and the matrix in which the textile filamentary element will be embedded once it has been bonded. The intermediate composition layer of the pre-bonded textile filamentary element cannot by itself ensure adhesion of the same quality as the external layer. An intermediate layer is advantageously used in the case of relatively nonpolar textile materials, for example in the case of aromatic polyamides.

A bonded textile filamentary element is one in which the constituent textile material(s) of the textile filamentary element are coated directly or indirectly (in the case of a pre-bonded textile filamentary element) with an external layer intended to ensure adhesion between the textile filamentary element in the natural state or pre-bonded textile filamentary element and the matrix.

A reinforcing textile filamentary element exhibiting a structure in accordance with the invention is commonly referred to by the expression "core insertion". Thus, the central core is inserted into the middle of the second strands of the layer, which are therefore peripheral and adjacent thereto. Each second strand of the layer is wound around the core without being wound around the or the other second strands of the layer.

Such a structure of the reinforcing textile filamentary element makes it possible to obtain advantageous mechanical properties. This is because when the reinforcing textile filamentary element is subjected to small elongations, the modulus of the reinforcing textile filamentary element remains relatively low, the latter then being governed by the core made up of a single first strand. Since the second strands of the layer are wound in a helix, they do not contribute towards increasing the value of the modulus at small elongations since the load is absorbed by the geometric deformation of the helix. When the reinforcing textile filamentary element is subjected to longer elongations, since the helix of the second strands of the layer has been consumed by the elongation, these contribute strongly towards increasing the modulus in addition to the contribution of the core.

On the other hand, such a structure of the reinforcing textile filamentary element makes it possible to obtain, independently of the method for manufacturing it, an endurance that is already much greater than that of a conventional hybrid textile filamentary element as described in WO2016/166056. This is because the textile filamentary element of the "core insertion" type, as described above, exhibits excellent endurance. The inventors are postulating the hypothesis that, during the compression of a conventional hybrid textile filamentary element as described in WO2016/166056, the aramid monofilaments are damaged and the force at break thereof is reduced such that, under the effect of repeated stress loadings, in particular during subsequent tensioning, the risk of breaking is increased significantly compared with before the compression thereof. During the compression of a textile filamentary element of the "core insertion" type, as described above, the monofilament(s) subjected to the greatest compression are those of the core, these monofilaments, if selected wisely, having a less oriented molecular structure, giving them good resistance to compressive stress loadings. Moreover, during compression of a textile filamentary element of the "core insertion" type, as described above, the monofilament(s) of the layer strands have more degrees of freedom compared with the aramid monofilaments of a conventional hybrid textile filamentary element as described in WO2016/166056. Thus, the monofilament(s) of the layer strands are designed so as to adapt to the mechanical stress loading, such that they are damaged less and preserve a higher force at break, allowing them to break less easily under the effect of the repeated stress loadings on the textile filamentary element.

The term filamentary means a reinforcing element extending longitudinally along a main axis and having a section perpendicular to the main axis, the largest dimension D of which is relatively small compared with the dimension L along the main axis. The expression relatively small means that L/D is greater than or equal to 100, preferably greater than or equal to 1000. This definition covers both filamentary reinforcing elements with a circular section and filamentary reinforcing elements with a non-circular section, for example a polygonal or oblong section. In the case of filamentary reinforcing elements with a non-circular section, the ratio of the largest dimension D of the section to the smallest dimension d of the section is greater than or equal to 20, preferably greater than or equal to 30 and more preferably greater than or equal to 50.

The term textile means that the filamentary element is not metallic. In other words, the filamentary element is made up of one or more non-metallic materials. Examples of such non-metallic materials are organic materials, in particular polymeric materials, and mineral materials such as carbon or glass.

In the description and the claims, any range of values denoted by the expression "between a and b" represents the range of values extending from more than a to less than b (namely excluding the end-points a and b), whereas any range of values denoted by the expression "from a to b" means the range of values extending from the end-point "a" as far as the end-point "b", namely including the strict end-points "a" and "b".

The expression "part by weight per hundred parts by weight of elastomer" (or phr) should be understood, within the meaning of the present invention, as meaning the part by weight per hundred parts by weight of elastomer.

The expression axial direction means the direction substantially parallel to the axis of rotation of the tyre.

The expression circumferential direction means the direction that is substantially perpendicular both to the axial direction and to a radius of the tyre (in other words, tangential to a circle of which the centre lies on the axis of rotation of the tyre).

The expression radial direction means the direction along a radius of the tyre, namely any direction that intersects the axis of rotation of the tyre and is substantially perpendicular to that axis.

The expression median plane (denoted M) means the plane perpendicular to the axis of rotation of the tyre that is situated mid-way between the two beads and passes through the middle of the crown reinforcement.

The expression equatorial circumferential plane (denoted E) means the theoretical plane passing through the equator of the tyre, perpendicular to the median plane and to the radial direction. The equator of the tyre is, in a circumferential section plane (plane perpendicular to the circumferential direction and parallel to the radial and axial directions), the axis parallel to the axis of rotation of the tyre and situated equidistantly between the radially outermost point of the tread that is intended to be in contact with the ground and the radially innermost point of the tyre that is intended to be in contact with a support, for example a rim, the distance between these two points being equal to H.

The twists N1, N1' and N2 can be measured using any method known to a person skilled in the art, for example in accordance with the standard ASTM D 885/D 885M-10a of 2014 (paragraph 30), for example using a torsiometer.

The count (or linear density) of each strand is determined in accordance with the standard ASTM D 885/D 885M-10a of 2014. The count is given in tex (weight, in grams, of 1000 m of product—remembering that: 0.111 tex is equal to 1 denier).

The tangent modulus, expressed in cN/tex/% is calculated on the basis of a force-elongation curve obtained by applying the standard ASTM D 885/D 885M-10a of 2014. From this force-elongation curve, the tangent modulus is deduced by calculating the derivative of the curve at each point. In the case of the bonded reinforcing textile filamentary element, the tangent modulus is measured for example directly before the step of embedding the reinforcing textile filamentary element in the ply in which it is intended to be embedded, that is to say without any other step that changes the properties of the tangent modulus having taken place between its final thermal treatment step and the embedding step.

The elongation at break and the force at break of a textile filamentary element are measured in accordance with the standard ASTM D 885/D 885M-10a of 2014. The elongation at break of a ply is equal to the elongation at break of the textile filamentary elements that it comprises.

The term ply means the assembly, for the one part, of a plurality of reinforcing filamentary elements and, for the other part, an elastomeric matrix, the reinforcing filamentary elements being embedded in the elastomeric matrix.

The secant modulus in tension of a ply for a force equal to 15% of the force at break is denoted $MA_{15}$ and is expressed in daN/mm. The modulus $MA_{15}$ is calculated on the basis of a force-elongation curve obtained by applying the standard ASTM D 885/D 885M-10a of 2014 to a reinforcing textile filamentary element of the ply. The secant modulus in tension of the reinforcing textile filamentary element is calculated by determining the gradient of the straight line drawn between the points (0,0) and the point of the curve having an ordinate value equal to 15% of the force at break. The modulus $MA_{15}$ is determined by multiplying the secant modulus in tension of the reinforcing textile filamentary element by the number of reinforcing textile filamentary elements per mm of ply, this number being determined in a direction perpendicular to the direction in which the reinforcing textile filamentary elements extend in the ply.

The force at break of a ply is calculated on the basis of a force-elongation curve obtained by applying the standard ASTM D 885/D 885M-10a of 2014 to a reinforcing textile filamentary element of the ply. The force at break of the ply is determined by multiplying the force at break of the reinforcing textile filamentary element by the number of reinforcing textile filamentary elements per mm of ply, this number being determined in a direction perpendicular to the direction in which the reinforcing textile filamentary elements extend in the ply.

The orientation of an angle means the direction, clockwise or anticlockwise, in which it is necessary to rotate from a reference straight line, in this instance the circumferential direction of the tyre, defining the angle in order to reach the other straight line defining the angle.

The stiffness in tension at 1% elongation of a strand is calculated on the basis of a force-elongation curve obtained by applying the standard ASTM D 885/D 885M-10a of 2014 to the strand, to which a twist of 100 turns/metre is applied. The stiffness in tension of the strand is calculated by determining the gradient of the straight line drawn between the point of the curve corresponding to a force equal to the standard pretension of 0.5 cN/tex and the point of the curve having an abscissa value equal to 1% elongation.

In a first embodiment of the method according to the invention:
  the reinforcing textile filamentary element in the natural state is coated with the external layer of the heat-crosslinkable adhesive composition,
  the reinforcing textile filamentary element in the natural state that is coated with the external layer is thermally treated so as to crosslink the adhesive composition in order to obtain the bonded reinforcing textile filamentary element,
  wherein, in said method, the steps of coating with and of thermally treating the external layer of the reinforcing textile filamentary element in the natural state are carried out such that, for an elongation equal to 30% of the elongation at break of the reinforcing textile filamentary element in the natural state, the tangent modulus of the bonded reinforcing textile filamentary element is increased compared with the tangent modulus of the reinforcing textile filamentary element in the natural state.

In this first embodiment, the reinforcing textile filamentary element in the natural state is covered with a single bonding layer. This external layer directly coats the reinforcing textile filamentary element in the natural state, meaning that the external layer is in contact with one or more textile monofilaments of the reinforcing textile filamentary element.

In a second embodiment of the method according to the invention:
  the reinforcing textile filamentary element in the natural state is coated with an intermediate layer of a first heat-crosslinkable adhesive composition,
  the reinforcing textile filamentary element in the natural state that is coated with the intermediate layer is thermally treated so as to crosslink the first adhesive composition in order to obtain the pre-bonded reinforcing textile filamentary element,
  the pre-bonded reinforcing textile filamentary element is coated with the external layer of a second heat-crosslinkable adhesive composition,
  the pre-bonded reinforcing textile filamentary element that is coated with the external layer is thermally treated so as to crosslink the second adhesive composition in order to obtain the bonded reinforcing textile filamentary element,
  wherein, in said method, the steps of coating with and of thermally treating the external layer of the pre-bonded reinforcing textile filamentary element are carried out such that, for an elongation equal to 30% of the elongation at break of the reinforcing textile filamentary element in the natural state, the tangent modulus of the bonded reinforcing textile filamentary element is increased compared with the tangent modulus of the reinforcing textile filamentary element in the natural state.

In this second embodiment, the reinforcing textile filamentary element in the natural state is covered with two bonding layers. An intermediate layer directly coats the reinforcing textile filamentary element in the natural state, meaning that the intermediate layer is in contact with one or more textile monofilaments of the reinforcing textile filamentary element. The external layer directly coats the intermediate layer, meaning that the external layer is in contact with the intermediate layer.

In one embodiment, the tangent modulus of the bonded reinforcing textile filamentary element is increased by applying, during the step of thermally treating the external layer, a treatment tension $T_{T2}$ greater than a standard pretension to the textile filamentary element. As is well known to a person skilled in the art of reinforcing textile filamentary elements, the standard pretension is equal to 0.5 cN/tex.

The inventors behind the invention found that the tension $T_{T2}$ applied to the reinforcing textile filamentary element in the natural state or pre-bonded reinforcing textile filamentary element made it possible to increase the tangent modulus, in particular for great elongations. Advantageously, the tension is relatively simple to control, either directly or by controlling the speed. A person skilled in the art will adapt the tension to be applied depending on the desired offset, in particular depending on the compromise between the modulus and the deformability of the bonded reinforcing textile filamentary element that he seeks.

Advantageously, with the core having a count Ta, the tangent modulus of the bonded reinforcing textile filamentary element is increased by applying, during the step of thermally treating the external layer, a treatment tension $T_{T2}$ such that $T_{T2}/Ta \geq 3$ cN/tex, preferably $T_{T2}/Ta \geq 6$ cN/tex, more preferably $T_{T2}/Ta \geq 10$ cN/tex and even more preferably $T_{T2}/Ta \geq 20$ cN/tex. The count Ta means the count of the first core strand, whether the first core strand is made up of one or more spun yarns. For low tensions applied to the reinforcing textile filamentary element, the core is stressed more than the layer, such that all that is necessary is to apply a tension greater than a relatively low threshold to increase the tangent modulus. Furthermore, the inventors noted that the higher the tension, the more the tangent modulus was increased.

Advantageously, with the layer having a count Tc, the tangent modulus of the bonded reinforcing textile filamentary element is increased by applying, during the step of thermally treating the external layer, a treatment tension $T_{T2}$ such that $T_{T2}/Tc \leq 10$ cN/tex, preferably $T_{T2}/Tc \leq 7$ cN/tex, more preferably $T_{T2}/Tc \leq 5$ cN/tex and even more preferably $T_{T2}/Tc \leq 4$ cN/tex. The count Tc means the sum of the counts of the second strands of the layer, whether each second strand of the layer is made up of one or more spun yarns. For greater tensions applied to the reinforcing textile filamentary element, the layer is then stressed in turn such that it is preferable not to exceed a tension that is too high, so as not to risk rupturing the core, and also so as not to excessively stress the layer, in particular when then second layer strands are made of materials that are sensitive to excessive stress loading.

For the same reasons as those mentioned above, in the second embodiment, during the step of thermally treating the intermediate layer, a treatment tension $T_{T1}$ such that $T_{T1}/Tc \leq 10$ cN/tex, preferably $T_{T1}/Tc \leq 7$ cN/tex, more preferably $T_{T1}/Tc \leq 5$ cN/tex and even more preferably $T_{T1}/Tc \leq 4$ cN/tex, is advantageously applied.

Advantageously, the steps of coating with and of thermally treating the external layer of the reinforcing element in the natural state or pre-bonded reinforcing element are carried out such that, for any elongation greater than or equal to 30% of the elongation at break of the reinforcing textile filamentary element in the natural state, the tangent modulus of the bonded reinforcing textile filamentary element is increased compared with the tangent modulus of the reinforcing textile filamentary element in the natural state, corresponding to an identical elongation. This ensures that all the tangent moduli corresponding to elongations greater than or equal to 30% of the elongation at break of the reinforcing textile filamentary element in the natural state are increased.

In one embodiment, the steps of coating with and of thermally treating the external layer of the reinforcing element in the natural state or pre-bonded reinforcing element are carried out such that, for an elongation equal to 20% of the elongation at break of the reinforcing textile filamentary element in the natural state, the tangent modulus of the bonded reinforcing textile filamentary element is increased compared with the tangent modulus of the reinforcing textile filamentary element in the natural state. In this case, the tangent moduli are increased for relatively small elongations. This makes it possible to further increase the modulus, specifically for relatively small elongations.

Advantageously, the steps of coating with and of thermally treating the external layer of the reinforcing element in the natural state or pre-bonded reinforcing element are carried out such that, for any elongation greater than or equal to 20% of the elongation at break of the reinforcing textile filamentary element in the natural state, the tangent modulus of the bonded reinforcing textile filamentary element is increased compared with the tangent modulus of the reinforcing textile filamentary element in the natural state, corresponding to an identical elongation. This ensures that all the tangent moduli corresponding to elongations greater than or equal to 20% of the elongation at break of the reinforcing textile filamentary element in the natural state are increased.

In preferred embodiments, with the bonded reinforcing textile filamentary element having an elongation at break greater than or equal to 6% and the reinforcing textile filamentary element in the natural state having an elongation at break greater than or equal to 6%, the steps of coating with and of thermally treating the external layer of the reinforcing element in the natural state or pre-bonded reinforcing element are carried out such that the tangent modulus at 6% elongation of the bonded reinforcing textile filamentary element is increased compared with the tangent modulus at 6% elongation of the reinforcing textile filamentary element in the natural state.

Preferably, the steps of coating with and of thermally treating the external layer of the reinforcing element in the natural state or pre-bonded reinforcing element are carried out such that, for any elongation ranging from 6% to the elongation at break of the reinforcing textile filamentary element in the natural state, the tangent modulus of the bonded reinforcing textile filamentary element is increased compared with the tangent modulus of the reinforcing textile filamentary element in the natural state, corresponding to an identical elongation. This ensures that all the tangent moduli corresponding to elongations greater than or equal to 6% of the elongation at break of the reinforcing textile filamentary element in the natural state are increased.

In preferred embodiments, with the bonded reinforcing textile filamentary element having an elongation at break greater than or equal to 4% and the reinforcing textile filamentary element in the natural state having an elongation at break greater than or equal to 4%, the steps of coating with and of thermally treating the external layer of the reinforcing element in the natural state or pre-bonded reinforcing element are carried out such that the tangent modulus at 4% elongation of the bonded reinforcing textile filamentary element is increased compared with the tangent modulus at 4% elongation of the reinforcing textile filamentary element in the natural state.

Preferably, the steps of coating and of thermally treating the external layer of the reinforcing element in the natural state or pre-bonded reinforcing element are carried out such that, for any elongation ranging from 4% to the elongation at break of the reinforcing textile filamentary element in the natural state, the tangent modulus of the bonded reinforcing textile filamentary element is increased compared with the tangent modulus of the reinforcing textile filamentary element in the natural state, corresponding to an identical elongation. This ensures that all the tangent moduli corresponding to elongations greater than or equal to 4% of the elongation at break of the reinforcing textile filamentary element in the natural state are increased.

In preferred embodiments, with the bonded reinforcing textile filamentary element having an elongation at break greater than or equal to 2% and the reinforcing textile filamentary element in the natural state having an elongation at break greater than or equal to 2%, the steps of coating with and of thermally treating the external layer of the reinforcing element in the natural state or pre-bonded reinforcing element are carried out such that the tangent modulus at 2% elongation of the bonded reinforcing textile filamentary element is increased compared with the tangent modulus at 2% elongation of the reinforcing textile filamentary element in the natural state.

Preferably, the steps of coating with and of thermally treating the external layer of the reinforcing element in the natural state or pre-bonded reinforcing element are carried out such that, for any elongation ranging from 2% to the elongation at break of the reinforcing textile filamentary element in the natural state, the tangent modulus of the bonded reinforcing textile filamentary element is increased compared with the tangent modulus of the reinforcing textile filamentary element in the natural state, corresponding to an identical elongation. This ensures that all the tangent moduli corresponding to elongations greater than or equal to 2% of the elongation at break of the reinforcing textile filamentary element in the natural state are increased.

Reinforcing Textile Filamentary Element in the Natural State

As explained above, the inventors behind the invention found that the lower the tangent modulus of the textile filamentary element in the natural state, the better the endurance was, this being the case all the more so when the tangent modulus of the textile filamentary element in the natural state was low for great elongations.

Thus, advantageously, the reinforcing textile filamentary element in the natural state has a tangent modulus lower than or equal to 3 cN/tex/% for any elongation less than or equal to 2%, preferably for any elongation less than or equal to 3%, more preferably for any elongation less than or equal to 4% and even more preferably for any elongation less than or equal to 5%. Preferably, the reinforcing textile filamentary element in the natural state has a tangent modulus lower than or equal to 3 cN/tex/% for any elongation less than or equal to 6%, preferably for any elongation less than or equal to 7%, more preferably for any elongation less than or equal to 8% and even more preferably for any elongation less than or equal to 9%.

Advantageously, the reinforcing textile filamentary element in the natural state has a tangent modulus lower than or equal to 5 cN/tex/% for any elongation less than or equal to 3%, preferably for any elongation less than or equal to 4.5%, more preferably for any elongation less than or equal to 5.5% and even more preferably for any elongation less than or equal to 6.5%. Preferably, the reinforcing textile filamentary element in the natural state has a tangent modulus lower than or equal to 5 cN/tex/% for any elongation less than or equal to 7.5%, preferably for any elongation less than or equal to 8.5%, more preferably for any elongation less than or equal to 9.5% and even more preferably for any elongation less than or equal to 10.5%.

Advantageously, the reinforcing textile filamentary element in the natural state has a tangent modulus lower than or equal to 10 cN/tex/% for any elongation less than or equal to 5%, preferably for any elongation less than or equal to 6.5%, more preferably for any elongation less than or equal to 7.5% and even more preferably for any elongation less than or equal to 8.5%. Preferably, the reinforcing textile filamentary element in the natural state has a tangent modulus lower than or equal to 10 cN/tex/% for any elongation less than or equal to 10%, preferably for any elongation less than or equal to 11%, more preferably for any elongation less than or equal to 12% and even more preferably for any elongation less than or equal to 13%.

Advantageously, the reinforcing textile filamentary element in the natural state has a tangent modulus lower than or equal to 15 cN/tex/% for any elongation less than or equal to 6%, preferably for any elongation less than or equal to 7.5%, more preferably for any elongation less than or equal to 9% and even more preferably for any elongation less than or equal to 10.5%. Preferably, the reinforcing textile filamentary element in the natural state has a tangent modulus lower than or equal to 15 cN/tex/% for any elongation less than or equal to 12%, preferably for any elongation less than or equal to 13%, more preferably for any elongation less than or equal to 14% and even more preferably for any elongation less than or equal to 15%.

Bonded Reinforcing Textile Filamentary Element

Four preferred embodiments of the invention will now be described. In a first embodiment, the deformability of the bonded textile filamentary element is maximized. In a second embodiment, the deformability is favoured in the compromise between deformability and modulus. In a third embodiment, the modulus is favoured in the compromise between deformability and modulus. In a fourth embodiment, the modulus of the bonded textile filamentary element is maximized.

The same advantages apply when the textile filamentary element is used in other reinforcements of the tyre, for example the working reinforcement or the carcass reinforcement.

The common features of the first and second embodiments are the following advantageous features.

Advantageously, the bonded reinforcing textile filamentary element has a tangent modulus lower than or equal to 3 cN/tex/% for any elongation less than or equal to 2%.

Advantageously, the bonded reinforcing textile filamentary element has a tangent modulus lower than or equal to 5 cN/tex/% for any elongation less than or equal to 3%.

Advantageously, the bonded reinforcing textile filamentary element has a tangent modulus lower than or equal to 10 cN/tex/% for any elongation less than or equal to 5%.

Advantageously, the bonded reinforcing textile filamentary element has a tangent modulus lower than or equal to 15 cN/tex/% for any elongation less than or equal to 6%.

By virtue of the properties defined above, the bonded reinforcing textile filamentary element has a force-elongation curve having a relatively low modulus at small elongations and thus good deformability. When the bonded reinforcing textile filamentary element is intended to form a reinforcing textile filamentary element of a hoop reinforcement, such a textile filamentary element allows, by virtue of a relatively low tangent modulus in the uncured state, that is to say before the curing step, easy radial and circumferential deformation of the tyre while it is being manufactured.

Advantageously, the bonded reinforcing textile filamentary element has an elongation at break greater than or equal to 10%.

First Embodiment of the Invention

Advantageously, the bonded reinforcing textile filamentary element has a tangent modulus lower than or equal to 3 cN/tex/% for any elongation less than or equal to 6%, preferably for any elongation less than or equal to 7%, more preferably for any elongation less than or equal to 8% and even more preferably for any elongation less than or equal to 9%.

Advantageously, the bonded reinforcing textile filamentary element has a tangent modulus lower than or equal to 5 cN/tex/% for any elongation less than or equal to 7.5%, preferably for any elongation less than or equal to 8.5%, more preferably for any elongation less than or equal to 9.5% and even more preferably for any elongation less than or equal to 10.5%.

Advantageously, the bonded reinforcing textile filamentary element has a tangent modulus lower than or equal to 10 cN/tex/% for any elongation less than or equal to 10%, preferably for any elongation less than or equal to 11%, more preferably for any elongation less than or equal to 12% and even more preferably for any elongation less than or equal to 13%.

Advantageously, the bonded reinforcing textile filamentary element has a tangent modulus lower than or equal to 15 cN/tex/% for any elongation less than or equal to 12%, preferably for any elongation less than or equal to 13%, more preferably for any elongation less than or equal to 14% and even more preferably for any elongation less than or equal to 15%.

Over a relatively wide range of elongations, the bonded reinforcing textile filamentary element has a relatively low tangent modulus, allowing excellent deformability. Thus, for a relatively wide range of elongations, the bonded reinforcing textile filamentary element and thus the ply in which it is intended to be embedded exert a relatively low force.

When the bonded reinforcing textile filamentary element is intended to form a reinforcing textile filamentary element of a hoop reinforcement, this reduces, during the tensioning of the hooping reinforcing textile filamentary element, the risks of the reinforcing textile filamentary element penetrating into the plies that are radially on the inside of the hooping ply and the risks of the obtained geometry of the tyre varying compared with the expected geometry of the tyre. Thus, advantageously, if desired, it is possible to reduce the pressure applied inside the tyre during curing.

Advantageously, the bonded reinforcing textile filamentary element has an elongation at break greater than or equal to 14%, preferably greater than or equal to 15%, more preferably greater than or equal to 16% and even more preferably greater than or equal to 17%.

Second Embodiment of the Invention

Advantageously, the bonded reinforcing textile filamentary element has a tangent modulus higher than or equal to 3 cN/tex/% for any elongation greater than or equal to 6%, preferably for any elongation greater than or equal to 5%, more preferably for any elongation greater than or equal to 4% and even more preferably for any elongation greater than or equal to 3%.

Advantageously, the bonded reinforcing textile filamentary element has a tangent modulus higher than or equal to 5 cN/tex/% for any elongation greater than or equal to 7.5%, preferably for any elongation greater than or equal to 6.5%, more preferably for any elongation greater than or equal to 5.5% and even more preferably for any elongation greater than or equal to 4.5%.

Advantageously, the bonded reinforcing textile filamentary element has a tangent modulus higher than or equal to 10 cN/tex/% for any elongation greater than or equal to 10%, preferably for any elongation greater than or equal to 8.5%, more preferably for any elongation greater than or equal to 7.5% and even more preferably for any elongation greater than or equal to 6.5%.

Advantageously, the bonded reinforcing textile filamentary element has a tangent modulus higher than or equal to 15 cN/tex/% for any elongation greater than or equal to 12%, preferably for any elongation greater than or equal to 10.5%, more preferably for any elongation greater than or equal to 9% and even more preferably for any elongation greater than or equal to 7.5%.

The modulus of the bonded reinforcing textile filamentary element is in this case relatively higher than in the first embodiment. Thus, as in the method for manufacturing the tyre, the elongation of each bonded reinforcing textile filamentary element is partially consumed, and the modulus of each reinforcing textile filamentary element once removed from the tyre for relatively low elongations corresponds to the modulus of each bonded reinforcing textile filamentary element in the uncured state for higher elongations. Consequently, the modulus of each reinforcing textile filamentary element once removed from the tyre is relatively high so as to ensure good mechanical strength properties of the ply in which it is embedded. Nevertheless, this stiffness remains sufficiently modest to allow excellent radial and circumferential deformability of the tyre.

When the bonded reinforcing textile filamentary element is intended to form a reinforcing textile filamentary element of a hoop reinforcement, the risks of the crown of the tyre collapsing while it is being manipulated are limited. This is because the relatively high modulus confers largely sufficient stiffness on the crown reinforcement of the tyre in order to support, in the uncured state, its own weight and that of the tread, and thus to reduce the risks of radial collapse of the crown on itself.

Advantageously, the bonded reinforcing textile filamentary element has an elongation at break less than or equal to 14%, preferably less than or equal to 13%, more preferably less than or equal to 12% and even more preferably less than or equal to 11%.

The common features of the third and fourth embodiments are the following advantageous features.

Advantageously, the bonded reinforcing textile filamentary element has a tangent modulus higher than or equal to 3 cN/tex/% for any elongation greater than or equal to 2%.

Advantageously, the bonded reinforcing textile filamentary element has a tangent modulus higher than or equal to 5 cN/tex/% for any elongation greater than or equal to 3%.

Advantageously, the bonded reinforcing textile filamentary element has a tangent modulus higher than or equal to 10 cN/tex/% for any elongation greater than or equal to 5%.

Advantageously, the bonded reinforcing textile filamentary element has a tangent modulus higher than or equal to 15 cN/tex/% for any elongation greater than or equal to 6%.

Advantageously, the bonded reinforcing textile filamentary element has an elongation at break less than or equal to 10%.

Third Embodiment of the Invention

Advantageously, the bonded reinforcing textile filamentary element has a tangent modulus lower than or equal to 3 cN/tex/% for any elongation less than or equal to 0.5%.

Advantageously, the bonded reinforcing textile filamentary element has a tangent modulus lower than or equal to 5 cN/tex/% for any elongation less than or equal to 0.75%.

Advantageously, the bonded reinforcing textile filamentary element has a tangent modulus lower than or equal to 10 cN/tex/% for any elongation less than or equal to 3%.

Advantageously, the bonded reinforcing textile filamentary element has a tangent modulus lower than or equal to 15 cN/tex/% for any elongation less than or equal to 4.5%.

The relatively high modulus, especially for small elongations, makes it possible to obtain an excellent force exerted by the textile filamentary element. Moreover, this stiffness also allows good radial and circumferential deformability of the tyre.

When the bonded reinforcing textile filamentary element is intended to form a reinforcing textile filamentary element of a hoop reinforcement, such an embodiment is particularly suitable in the case of tyres that do not require high radial and circumferential expansion.

Advantageously, the bonded reinforcing textile filamentary element has an elongation at break ranging from 8% to 10%.

Fourth Embodiment of the Invention

Advantageously, the bonded reinforcing textile filamentary element has a tangent modulus higher than or equal to 3 cN/tex/% for any elongation greater than or equal to 0.5%.

Advantageously, the bonded reinforcing textile filamentary element has a tangent modulus higher than or equal to 5 cN/tex/% for any elongation greater than or equal to 0.75%.

Advantageously, the bonded reinforcing textile filamentary element has a tangent modulus higher than or equal to 10 cN/tex/% for any elongation greater than or equal to 3%.

Advantageously, the bonded reinforcing textile filamentary element has a tangent modulus higher than or equal to 15 cN/tex/% for any elongation greater than or equal to 4.5%.

By virtue of a very high modulus starting from small elongations, an exerted force that is very quickly very high is obtained, this making it possible, for low stress loadings, to absorb forces very effectively.

When the bonded reinforcing textile filamentary element is intended to form a reinforcing textile filamentary element of a hoop reinforcement, such an embodiment is particularly suitable in the case of tyres that do not require high radial and circumferential expansion.

Advantageously, the bonded reinforcing textile filamentary element has an elongation at break ranging from 6% to 8%.

Other Preferred Features

Preferably, the sum of the stiffnesses in tension at 1% elongation of the second strands, denoted Sc, is greater than the stiffness in tension at 1% elongation of the first strand, denoted Sa, and preferably Sc/Sa≥10, more preferably Sc/Sa≥50 and even more preferably Sc/Sa≥100. Since the stiffness of the layer is relatively high, the hooping reinforcing textile filamentary element has a stiffness that is significantly greater at great elongations than at small elongations.

In this embodiment, and those that follow, it is possible to obtain an adapted bimodulus behaviour of the force-elongation curve of the reinforcing textile filamentary element by virtue of a wise choice of stiffnesses and thus of moduli of the first and second strands, the difference in stiffnesses and thus in moduli between the core and the layer being increased by the "core insertion" structure as explained above. Advantageously, the first strand has a secant modulus in tension at 1% elongation lower than or equal to 2500 cN/tex, preferably lower than or equal to 900 cN/tex and more preferably lower than or equal to 500 cN/tex.

Advantageously, each second strand has a secant modulus in tension at 1% elongation higher than or equal to 500 cN/tex, preferably higher than or equal to 1000 cN/tex and more preferably higher than or equal to 2200 cN/tex.

Thus, the reinforcing textile filamentary element has a force-elongation curve having a relatively low modulus at small elongations and a relatively high modulus at great elongations by virtue of the relatively different moduli in tension of the first and second strands.

In one embodiment, the first strand comprises a single monofilament. In a preferred embodiment, the first strand is a multifilament strand comprising a plurality of monofilaments.

In one embodiment, each second strand comprises a single monofilament. In a preferred embodiment, each second strand is a multifilament strand comprising a plurality of monofilaments.

A monofilament is made of a given material and denotes a monolithic filament resulting, for example, from the spinning of this material, for example by melt spinning, solution spinning or gel spinning.

In the case of a strand comprising a single monofilament, the monofilament typically has a diameter ranging from 0.03 mm to 0.50 mm.

In the case of a multifilament strand comprising a plurality of monofilaments, the monofilaments typically have diameters ranging from 2 to 30 µm. Each multifilament strand of monofilaments comprises at least 2 elementary filaments, typically more than 10 elementary filaments, preferably more than 100 elementary filaments and more preferably more than 500 elementary filaments.

In the embodiments described above, each monofilament can be produced from one or more materials so as to form a monolithic filament. Preferably and for reasons of industrial costs, each monofilament is made of a single textile material.

In an advantageous embodiment, the monofilament(s) of the first strand is or are made of a material selected from polyesters, aliphatic polyamides, celluloses and mixtures of monofilaments of these materials, preferably made of a material selected from aliphatic polyamides and more preferably made of nylon 6.6. Aliphatic polyamides and in particular nylon 6.6 have an unoriented molecular structure giving them good resistance to compressive stresses, this being a sought-after quality for the core of the reinforcing textile filamentary element, in particular in order to improve the endurance thereof.

In an advantageous embodiment, the monofilament(s) of each second strand is or are made of a material selected from aromatic polyamides, aromatic copolyamides, polyketones and mixtures of monofilaments of these materials, preferably made of a material selected from aromatic polyamides and more preferably made of para-aramid. Aromatic polyamides and in particular para-aramid have excellent tenacity giving them a good force at break, this being a sought-after quality for the layer of the reinforcing textile filamentary element.

In the above embodiments, mixtures of monofilaments of these materials mean multifilament strands comprising a mixture of monofilaments made of different materials. Such multifilament strands are described in particular in WO2009052844.

As far as the monofilament made of aromatic polyamide or aromatic copolyamides is concerned, it will be recalled that, as is well known, this is a monofilament of linear macromolecules formed of aromatic groups held together by amide bonds of which at least 85% are directly connected to two aromatic cores, and more particularly of fibres made of poly(p-phenylene terephthalamide) (or PPTA), which have been manufactured for a long time from optically anisotropic spinning compositions. Among aromatic polyamides or aromatic copolyamides, mention may be made of polyarylamides (or PAA, notably known by the Solvay company trade name Ixeft, poly(metaxylylene adipamide), polyphthalamides (or PPA, notably known by the Solvay company trade name Amodel), amorphous semiaromatic polyamides (or PA 6-3T, notably known by the Evonik company trade name Trogamid), or para-aramids (or poly(paraphenylene terephthalamide or PA PPD-T notably known by the Du Pont de Nemours company trade name Kevlar or the Teijin company trade name Twaron).

A polyketone monofilament is understood to be a monofilament made of thermoplastic polymer obtained by polycondensation of ethylene and carbon monoxide. Polyketone filaments are, for their part, also described in a very large number of publications, for example EP 310 171, EP 456 306, EP 1 925 467, WO 2002/068738 or U.S. Pat. No. 6,818,728, US 2007/0017620, US 2009/0266462. For example, Karilon from the company Hyosung, Akrotek from the company Akro-Plastic or Schulaketon from the company Schulman may be mentioned.

As far as the polyester monofilament is concerned, it will be recalled that this is a monofilament of linear macromolecules formed of groups held together by ester bonds. Polyesters are produced by polycondensation by esterification between a dicarboxylic acid, or one of the derivatives thereof, and a diol. For example, polyethylene terephthalate can be manufactured by the polycondensation of terephthalic acid and ethylene glycol. Among known polyesters, mention may be made of polyethylene terephthalate (PET), polyethylene naphthalate (PEN), polybutylene terephthalate (PBT), polybutylene naphthalate (PBN), polypropylene terephthalate (PPT) or polypropylene naphthalate (PPN).

As far as the aliphatic polyamide monofilament is concerned, this is understood to be a monofilament of linear macromolecules of polymers or copolymers containing amide functions that do not have aromatic rings and can be synthesized by polycondensation between a carboxylic acid and an amine. Among the aliphatic polyamides, mention may be made of nylons PA4.6, PA6, PA6.6 or PA6.10, and in particular Zytel from the company DuPont, Technyl from the company Solvay or Rilsamid from the company Arkema.

As far as a cellulose monofilament is concerned, this is understood to be a monofilament made of a cellulosic material, that is to say a cellulose-based material, a cellulose derivative or cellulose regenerated from a cellulose derivative, regardless of course of the spinning process. The expression "cellulose derivative" should be understood as meaning any compound formed, as a result of chemical reactions, by substitution of hydroxyl groups of cellulose, this derivative also being known as a substitution derivative. In an equally known way, "regenerated cellulose" is understood as being a cellulose obtained by a regeneration treatment carried out on a cellulose derivative. As examples of cellulosic fibres, mention may be made for example of rayon or viscose fibres sold by the company Cordenka or "Lyocell" fibres sold by the company Hyosung. Mention may also be made of high-modulus fibres made of cellulose formate or of regenerated cellulose such as the ones described in the applications WO 85/05115 or WO 97/06294.

Thus, in a preferred embodiment, the first strand of the core comprises at least one monofilament made of an aliphatic polyamide, preferably made of nylon 6.6. Preferably, the first strand is a multifilament strand comprising a plurality of monofilaments made of an aliphatic polyamide, preferably made of nylon 6.6. The inventors discovered that the constituent material of the core had a significant influence on the endurance under compression of the textile filamentary element. This is because, by being at the centre of the textile filamentary element and thus without a helix, the material of the core is immediately stressed when the textile filamentary element is axially compressed. Since aliphatic polyamides exhibit an improved endurance under compression compared with polyesters, the inventors thus obtained a reinforcing textile filamentary element with very high endurance under compression.

In a preferred embodiment, each second strand of the layer comprises at least one monofilament made of an aromatic polyamide, preferably made of para-aramid. Preferably, each second strand of the layer is a multifilament strand comprising a plurality of monofilaments made of an aromatic polyamide, preferably made of para-aramid. The inventors discovered that, for low stress loadings and thus small elongations, the second layer strands, on account of their helix, had little influence on the modulus since the constituent material of the monofilaments of the second layer strands is not stressed. For high stress loadings and thus great elongations, since the elongation brought about by the helix has been consumed by the stress loading, the constituent material of the monofilaments of the second layer strands is then stressed. As a result of the selection of an aromatic polyamide which has excellent tenacity, the modulus of the reinforcing element is maximized for these high stress loadings without excessively increasing the modulus of the reinforcing element for smaller elongations.

In one embodiment, the layer is made up of three or four second strands, preferably three second strands. In this way, the entire external surface of the core is covered easily. Use is preferably made of three second strands so as to limit the diameter of the or each reinforcing textile filamentary element.

Advantageously, the twist factor of the first strand of the core ranges from 60 to 80, preferably from 65 to 75. Advantageously, the twist factor of each second strand of the layer ranges from 90 to 120, preferably from 100 to 115.

The twist factor of a strand is equal to $R \times (T/(1000 \times \rho))^{\wedge}(1/2)$, in which relationship R is the twist of the strand in turns per metre before it is assembled within the reinforcing textile filamentary element, T is the count of the strand in tex, and $\rho$ is the density of the constituent material of the monofilament(s) of the strand.

Advantageously, the twist factor of the reinforcing textile filamentary element ranges from 170 to 220, preferably from 180 to 210.

The twist factor of the reinforcing textile filamentary element is equal to $R' \times (T'/(1000 \times \rho'))^{\wedge}(1/2)$, in which relationship R' is the twist of the reinforcing textile filamentary element in turns per metre, T' is the count of the reinforcing textile filamentary element, and $\rho'$ is the density of the constituent materials of the monofilament(s) of the reinforcing textile filamentary element. In the case of different materials, the count is obtained by taking an average of the counts of the strands weighted by the number of strands. In the case of different materials, the density is obtained by taking an average of the densities weighted by the number of stands and the count of each strand.

In a first variant of the core, the first strand of the core is made up of a spun yarn, the spun yarn comprising at least one monofilament, preferably the spun yarn comprising a plurality of monofilaments. In this first variant, the prior steps of assembling a plurality of spun yarns to manufacture the strand of the core are avoided.

In a second variant of the core, the first strand of the core comprises an assembly comprising at least two different spun yarns, each spun yarn comprising at least one monofilament, preferably each spun yarn comprising a plurality of monofilaments.

Advantageously, the count of the first strand of the core ranges from 10 tex to 100 tex, preferably from 40 tex to 60 tex. The count of the strand is understood to be the sum of the counts of the constituent spun yarn(s) of the first strand of the core. Thus, in the first variant of the core, the count of the spun yarn ranges from 10 tex to 100 tex, preferably from 40 tex to 60 tex. In the second variant of the core, in the case of two constituent spun yarns of the first strand of the core, the count of each spun yarn ranges from 5 tex to 50 tex, preferably from 20 tex to 30 tex.

In a first variant of the layer, each second strand of the layer is made up of a spun yarn, the spun yarn comprising at least one monofilament, preferably the spun yarn comprising a plurality of monofilaments. In this first variant, the prior steps of assembling a plurality of spun yarns to manufacture each strand of the layer are avoided.

In a second variant of the layer, each second strand of the layer comprises an assembly comprising at least two different spun yarns, each spun yarn comprising at least one monofilament, preferably each spun yarn comprising a plurality of monofilaments.

Advantageously, the count of each second strand of the layer ranges from 50 tex to 350 tex, preferably from 130 tex to 220 tex. The count of the strand is understood to be the sum of the counts of the constituent spun yarn(s) of each second strand of the layer. Thus, in the first variant of the layer, the count of the spun yarn ranges from 50 tex to 350 tex, preferably from 130 tex to 220 tex. In the second variant of the layer, in the case of two constituent spun yarns of each second strand of the layer, the count of each spun yarn ranges from 25 tex to 175 tex, preferably from 65 tex to 110 tex.

Advantageously, the ratio of the count of the first strand of the core to the sum of the counts of the second strands of the layer ranges from 0.05 to 0.15. This ensures that the core is covered sufficiently by the layer, meaning that the first strand of the core is entirely contained inside a space delimited by the layer.

In one embodiment, the method comprises the following steps:
- a step of twisting the first strand of the core through a number of turns per metre N1 in a first direction of twisting,
- a step of twisting each second strand of the layer through a number of turns per metre N1' in the first direction of twisting,
- an assembly step by twisting the first strand of the core and the second strands of the layer through a number of turns per metre N2 in a second direction of twisting opposite to the first direction of twisting so as to obtain the reinforcing filamentary element in the natural state.

Preferably, N1>N1' and N2=N1'. On account of the geometry of the reinforcing textile filamentary element, the core needs less untwisting in the second direction to have zero residual twisting of its monofilaments, whereas the layer needs substantially equal untwisting in the second direction to have zero residual twisting. Advantageously, $1.02 \leq N1/N1' \leq 1.15$, preferably $1.05 \leq N1/N1' \leq 1.10$.

In order to obtain the best compromise between force at break and endurance of the reinforcing textile filamentary element having the counts defined above:
- N1 ranges from 300 to 380 turns per metre, preferably from 320 to 360 turns per metre,
- N1' ranges from 275 to 355 turns per metre, preferably from 295 to 335 turns per metre, and
- N2 ranges from 275 to 355 turns per metre, preferably from 295 to 335 turns per metre.

A further subject of the invention is a method for manufacturing a tyre, comprising
- a method for manufacturing a bonded reinforcing textile filamentary element as defined above,
- a step of manufacturing a ply, during which the bonded reinforcing textile filamentary element is embedded in a composition, and
- a step of curing a green form of the tyre comprising the ply so as to obtain the tyre.

Another subject of the invention is a bonded reinforcing textile filamentary element that is able to be obtained by a method as defined above.

Yet another subject of the invention is a tyre comprising a bonded reinforcing textile filamentary element as defined above.

In an embodiment particularly suited to the bonded reinforcing textile filamentary element described above, the tyre comprises a crown reinforcement comprising a hoop reinforcement comprising a hooping ply comprising at least one hooping reinforcing textile filamentary element that makes an angle of strictly less than 10° with the circumferential direction of the tyre, the or each hooping reinforcing textile filamentary element being a bonded reinforcing textile filamentary element as defined above.

Advantageously, the hoop reinforcement comprises a single hooping ply. Thus, the hoop reinforcement, apart from the hooping ply, does not have any ply reinforced by filamentary reinforcing elements. The filamentary reinforcing elements of such reinforced plies excluded from the hoop reinforcement of the tyre comprise the metal filamentary reinforcing elements and the textile filamentary reinforcing elements. Very preferably, the hoop reinforcement is formed by a hooping ply.

Advantageously, the or each hooping reinforcing textile filamentary element makes an angle strictly less than 10°, preferably less than or equal to 7° and more preferably less than or equal to 5° with the circumferential direction of the tyre.

In a first embodiment, the hooping ply advantageously has a secant modulus in tension higher than or equal to 200 daN/mm for a force equal to 15% of the force at break of the hooping ply. In a second embodiment, the hooping ply advantageously has a secant modulus in tension higher than or equal to 500 daN/mm for a force equal to 15% of the force at break of the hooping ply.

In the first embodiment, the hooping ply advantageously has a secant modulus in tension lower than or equal to 500 daN/mm for a force equal to 15% of the force at break of the hooping ply. In the second embodiment, the hooping ply advantageously has a secant modulus in tension lower than or equal to 800 daN/mm for a force equal to 15% of the force at break of the hooping ply.

Advantageously, the force at break of the hooping ply is greater than or equal to 35 daN/mm, preferably greater than or equal to 45 daN/mm and more preferably greater than or equal to 55 daN/mm. In the second embodiment, the force at break of the hooping ply is advantageously greater than or equal to 60 daN/mm, preferably greater than or equal to 70 daN/mm.

Advantageously, the or each hooping reinforcing textile filamentary element, once removed from the tyre, has a tangent modulus higher than or equal to 5 cN/tex/% for any elongation greater than or equal to 4%, preferably greater than or equal to 3.5%, more preferably greater than or equal to 3% and even more preferably greater than or equal to 2%. Such a reinforcing textile filamentary element makes it possible, by virtue of a relatively high tangent modulus of the hooping textile filamentary element(s) in the cured state, that is to say after the tyre has been manufactured, to obtain a sufficiently mechanically robust hoop reinforcement and thus to lighten the crown reinforcement of the tyre without risking impairing the performance of the tyre. Thus, the hoop reinforcement has a high modulus for very small elongations and makes it possible to absorb high forces very quickly. This makes it possible to lighten the rest of the crown reinforcement of the tyre even further, in particular by virtue of the means described below.

Advantageously, the or each hooping reinforcing textile filamentary element, once removed from the tyre, has a tangent modulus higher than or equal to 10 cN/tex/% for any elongation greater than or equal to 6%, preferably greater than or equal to 5% and more preferably greater than or equal to 4%.

Advantageously, the or each hooping reinforcing textile filamentary element, once removed from the tyre, has a tangent modulus higher than or equal to 15 cN/tex/% for any elongation greater than or equal to 8%, preferably greater than or equal to 7% and more preferably greater than or equal to 6%.

Advantageously, the or each hooping reinforcing textile filamentary element, once removed from the tyre, has a tangent modulus higher than or equal to 20 cN/tex/% for any elongation greater than or equal to 8%.

Similarly, for greater elongations, the hoop reinforcement has a relatively high, or even very high, modulus, making it possible to comfortably lighten the crown reinforcement of the tyre without risking damaging the mechanical properties thereof.

Advantageously, the or each hooping reinforcing textile filamentary element, once removed from the tyre, has an elongation at break greater than or equal to 6%, preferably greater than or equal to 7% and more preferably greater than or equal to 8%. Thus, the or each hooping reinforcing textile filamentary element has a sufficiently great elongation at break for absorbing the deformations undergone by the crown reinforcement while the tyre is rolling, even under harsh conditions. Similarly, the hooping ply, once removed from the tyre, has an elongation at break greater than or equal to 6%, preferably greater than or equal to 7% and more preferably greater than or equal to 8%.

In one embodiment, the tyre comprises a crown comprising a tread, two sidewalls and two beads, each sidewall connecting each bead to the crown, the crown reinforcement extending in the crown in a circumferential direction of the tyre.

In one embodiment, the tyre comprises a carcass reinforcement that is anchored in each of the beads and extends in the sidewalls and in the crown, the crown reinforcement being radially interposed between the carcass reinforcement and the tread.

Advantageously, the carcass reinforcement comprises a single carcass ply. Thus, the carcass reinforcement, apart from the carcass ply, does not have any ply reinforced by filamentary reinforcing elements. The filamentary reinforcing elements of such reinforced plies excluded from the carcass reinforcement of the tyre comprise the metal filamentary reinforcing elements and the textile filamentary reinforcing elements. Very preferably, the carcass reinforcement is formed by a carcass ply.

Preferably, the single carcass ply comprises carcass reinforcing filamentary elements.

In one embodiment, the crown reinforcement comprises a working reinforcement comprising a single working ply. Thus, the working reinforcement, apart from the working ply, does not have any ply reinforced by filamentary reinforcing elements. The filamentary reinforcing elements of such reinforced plies excluded from the working reinforcement of the tyre comprise the metal filamentary reinforcing elements and the textile filamentary reinforcing elements. Very preferably, the working reinforcement is formed by a working ply. The mechanical strength and endurance properties of the hoop reinforcement that are described above make it possible to eliminate a working ply from the working reinforcement. A significantly lighter tyre is obtained.

In one embodiment, the hoop reinforcement is radially interposed between the working reinforcement and the tread. In a variant, the hoop reinforcement could be radially interposed between the working reinforcement and the carcass reinforcement.

Preferably, the single working ply comprises working reinforcing filamentary elements.

In the tyre described, the crown comprises the tread and the crown reinforcement. The tread is understood to be a strip of polymeric, preferably elastomeric, material delimited:
  radially towards the outside by a surface intended to be in contact with the ground and
  radially towards the inside by the crown reinforcement.

The strip of polymeric material is made up of a ply of a polymeric, preferably elastomeric, material material or is made up of a stack of several plies, each ply being made up of a polymeric, preferably elastomeric, material material.

In a very preferred embodiment, the crown reinforcement comprises a single hoop reinforcement and a single working reinforcement. Thus, the crown reinforcement, apart from the hoop reinforcement and the working reinforcement, does not have any reinforcement reinforced by reinforcing elements. The reinforcing elements of such reinforcements excluded from the crown reinforcement of the tyre comprise the filamentary reinforcing elements, the knits or the woven fabrics. Very preferably, the crown reinforcement is made up of the hoop reinforcement and the working reinforcement.

In a very preferred embodiment, the crown, apart from the crown reinforcement, does not have any reinforcement reinforced by reinforcing elements. The reinforcing elements of such reinforcements excluded from the crown of the tyre comprise the filamentary reinforcing elements, the knits or the woven fabrics. Very preferably, the crown is made up of the tread and the crown reinforcement.

In a very preferred embodiment, the carcass reinforcement is arranged so as to be directly radially in contact with the crown reinforcement and the crown reinforcement is arranged so as to be directly radially in contact with the tread. In this very preferred embodiment, the single hooping ply and the single working ply are advantageously arranged so as to be directly radially in contact with one another.

The expression directly radially in contact means that the objects in question that are directly radially in contact with one another, in this case the plies, reinforcements or the tread, are not separated radially by any object, for example by any ply, reinforcement or strip interposed radially between the objects in question that are directly radially in contact with one another.

In one embodiment, the hooping reinforcing textile filamentary elements, the working reinforcing filamentary elements and the carcass reinforcing filamentary elements are arranged so as to define, in projection onto the equatorial circumferential plane, a triangle mesh. Such a mesh makes it possible to obtain properties similar to those of a conventional prior art tyre comprising a hooping ply, two working plies and a carcass ply.

In one embodiment, each carcass reinforcing filamentary element makes an angle $A_{C1}$ greater than or equal to 55°, preferably ranging from 55° to 80° and more preferably ranging from 60° to 70°, with the circumferential direction of the tyre in the median plane of the tyre. Thus, the carcass reinforcing filamentary elements, on account of the angle formed with the circumferential direction, are involved in the formation of a triangle mesh in the crown of the tyre.

In one embodiment, each carcass reinforcing filamentary element makes an angle $A_{C2}$ greater than or equal to 85° with the circumferential direction of the tyre in the equatorial circumferential plane of the tyre. The carcass reinforcing filamentary elements are substantially radial in each sidewall, that is to say substantially perpendicular to the circumferential direction, thereby making it possible to retain all the advantages of a radial tyre.

In one embodiment, each working reinforcing filamentary element makes an angle $A_T$ greater than or equal to 10°, preferably ranging from 30° to 50° and more preferably from 35° to 45°, with the circumferential direction of the tyre in the median plane of the tyre. Thus, the working reinforcing filamentary elements, on account of the angle formed with the circumferential direction, are involved in the formation of the triangle mesh in the crown of the tyre.

In order to form a triangle mesh that is as effective as possible, the orientation of the angle $A_T$ and the orientation of the angle $A_{C1}$ are preferably opposite with respect to the circumferential direction of the tyre.

Advantageously, the reinforcing filamentary elements of each ply are embedded in an elastomeric matrix. The different plies may comprise the same elastomeric matrix or different elastomeric matrices.

An elastomeric matrix is understood to be a matrix that exhibits elastomeric behaviour in the crosslinked state. Such a matrix is advantageously obtained by crosslinking a composition comprising at least one elastomer and at least one other component. Preferably, the composition comprising at least one elastomer and at least one other component comprises an elastomer, a crosslinking system, and a filler.

Preferably, the elastomer is a diene elastomer, that is to say, as will be recalled, any elastomer (single elastomer or blend of elastomers) which is derived, at least in part (i.e. a homopolymer or copolymer), from diene monomers, that is to say monomers that bear two carbon-carbon double bonds, whether these are conjugated or not. This diene elastomer is more preferably selected from the group consisting of polybutadienes (BR), natural rubber (NR), synthetic polyisoprenes (IR), butadiene copolymers, isoprene copolymers and blends of these elastomers, such copolymers being notably selected from the group consisting of butadiene-styrene copolymers (SBR), isoprene-butadiene copolymers (BIR), isoprene-styrene copolymers (SIR) and isoprene-butadiene-styrene copolymers (SBIR). One particularly preferred embodiment consists in using an "isoprene" elastomer, that is to say an isoprene homopolymer or copolymer, in other words a diene elastomer selected from the group consisting of natural rubber (NR), synthetic polyisoprenes (IR), various isoprene copolymers and mixtures of these elastomers.

Preferably, the crosslinking system for each composition is a system referred to as a vulcanization system, that is to say one based on sulfur (or a sulfur donor agent) and a primary vulcanization accelerator. Various known secondary vulcanization accelerators or vulcanization activators may be added to this basic vulcanization system. Sulfur is used at a preferred content of between 0.5 and 10 phr, and the primary vulcanization accelerator, for example a sulfenamide, is used at a preferred content of between 0.5 and 10 phr. The content of reinforcing filler, for example of carbon black and/or silica, is preferably higher than 30 phr, notably between 30 and 100 phr. The term "phr" means parts by weight per hundred parts of elastomer.

All carbon blacks, especially blacks of the HAF, ISAF or SAF type, conventionally used in tyres ("tyre-grade" blacks) are suitable as carbon blacks. Mention will more particularly be made, among the latter, of the carbon blacks of 300, 600 or 700 (ASTM) grade (for example N326, N330, N347, N375, N683 or N772). Precipitated or fumed silicas having a BET surface area of less than 450 m$^2$/g, preferably of 30 to 400 m$^2$/g, are especially suitable as silicas.

A person skilled in the art will know, in light of the present description, how to adjust the formulation of the compositions in order to achieve the desired levels of properties (especially modulus of elasticity), and to adapt the formulation to suit the specific application envisaged. Thus, each composition may contain a single or several diene elastomer(s), and also all or some of the additives usually employed in the compositions intended for the manufacture of tyres, such as, for example, reinforcing fillers such as carbon black or silica, coupling agents, anti-ageing agents, antioxidants, plasticizers or extender oils, whether the latter are aromatic or non-aromatic in nature (especially oils that are very slightly aromatic, if at all, for example of the naphthene or paraffin type, with high or preferably low viscosity, MES or TDAE oils), plasticizing resins with a high glass transition temperature (higher than 30° C.), agents that improve the processability of the compositions in the uncured state, tackifying resins, anti-reversion agents, methylene acceptors and donors such as HMT (hexamethylenetetramine) or H3M (hexamethoxymethylmelamine) for example, reinforcing resins, known adhesion promoter systems of the metal salt type for example, especially cobalt salts, nickel salts or lanthanide salts.

Preferably, each elastomer matrix has a secant modulus in extension, at 10% elongation, of between 4 and 25 MPa, more preferably between 4 and 20 MPa; values in particular between 5 and 15 MPa have proven to be particularly suitable. Modulus measurements are carried out under tension, unless otherwise indicated, in accordance with the standard ASTM D 412 of 1998 (test specimen "C"): the "true" secant modulus (that is to say the one with respect to the actual cross section of the test specimen) is measured in second elongation (that is to say after an accommodation cycle) at 10% elongation, denoted here by Ms and expressed in MPa (under standard temperature and relative humidity conditions in accordance with the standard ASTM D 1349 of 1999).

Advantageously, each working reinforcing filamentary element is metallic. A metallic filamentary element means, by definition, a filamentary element formed of one thread or an assembly of several threads made entirely (100% of the threads) of a metallic material. Such a metallic filamentary element is preferably implemented with one or more threads made of steel, more preferably of pearlitic (or ferritic-pearlitic) carbon steel referred to as "carbon steel" below, or made of stainless steel (by definition steel comprising at least 11% chromium and at least 50% iron). However, it is of course possible to use other steels or other alloys. When a carbon steel is advantageously used, its carbon content (% by weight of steel) is preferably between 0.2% and 1.2%, in particular between 0.5% and 1.1%; these contents represent a good compromise between the mechanical properties required for the tyre and the feasibility of the threads. The metal or the steel used, whether it is in particular a carbon steel or a stainless steel, may itself be coated with a metallic layer which improves for example the workability of the metallic cord and/or of its constituent elements, or the use properties of the cord and/or of the tyre themselves, such as properties of adhesion, corrosion resistance or resistance to ageing. According to a preferred embodiment, the steel used is covered with a layer of brass (Zn—Cu alloy) or of zinc.

The invention will be understood better from reading the following description, which is given solely by way of non-limiting example and with reference to the drawings.

Example of a Tyre According to the Invention

A frame of reference X, Y, Z corresponding to the usual respectively axial (X), radial (Y) and circumferential (Z) directions of a tyre is shown in the figures.

FIG. 1 shows a tyre according to the invention and denoted by the general reference 10. The tyre 10 substantially exhibits revolution about an axis substantially parallel to the axial direction X. The tyre 10 is in this case intended for a passenger vehicle.

The tyre 10 has a crown 12 comprising a tread 20 and a crown reinforcement 14 extending in the crown 12 in the circumferential direction Z.

The crown reinforcement 14 comprises a working reinforcement 16 comprising a single working ply 18 and a hoop reinforcement 17 comprising a single hooping ply 19. In other words, the working reinforcement 16 is made up of the working ply 18 and the hoop reinforcement 17 is made up of the hooping ply 19.

The crown reinforcement 14 is surmounted by the tread 20. Here, the hoop reinforcement 17, in this case the hooping ply 19, is radially interposed between the working reinforcement 16 and the tread 20.

The tyre 10 comprises two sidewalls 22 extending the crown 12 radially inwards. The tyre 10 also comprises two beads 24 that are radially on the inside of the sidewalls 22 and each comprise an annular reinforcing structure 26, in this instance a bead wire 28, surmounted by a mass of filling rubber 30, and also a radial carcass reinforcement 32. The crown reinforcement 14 is situated radially between the carcass reinforcement 32 and the tread 20. Each sidewall 22 connects each bead 24 to the crown 12.

The carcass reinforcement 32 has a single carcass ply 34. The carcass reinforcement 32 is anchored in each of the beads 24 by being turned up around the bead wire 28 so as to form, within each bead 24, a main strand 38 extending from the beads 24 through the sidewalls 22 and into the crown 12, and a turnup strand 40, the radially outer end 42 of the turnup strand 40 being radially on the outside of the annular reinforcing structure 26. The carcass reinforcement 32 thus extends from the beads 24 through the sidewalls 22 as far as into the crown 12. In this embodiment, the carcass reinforcement 32 also extends axially through the crown 12. The crown reinforcement 14 is radially interposed between the carcass reinforcement 32 and the tread 20.

In a variant, the hoop reinforcement 17 could be radially interposed between the working reinforcement 16 and the carcass reinforcement 32.

Each working ply 18, hooping ply 19 and carcass ply 34 comprises an elastomeric matrix in which one or more reinforcing elements of the corresponding ply are embedded.

Figure 2:
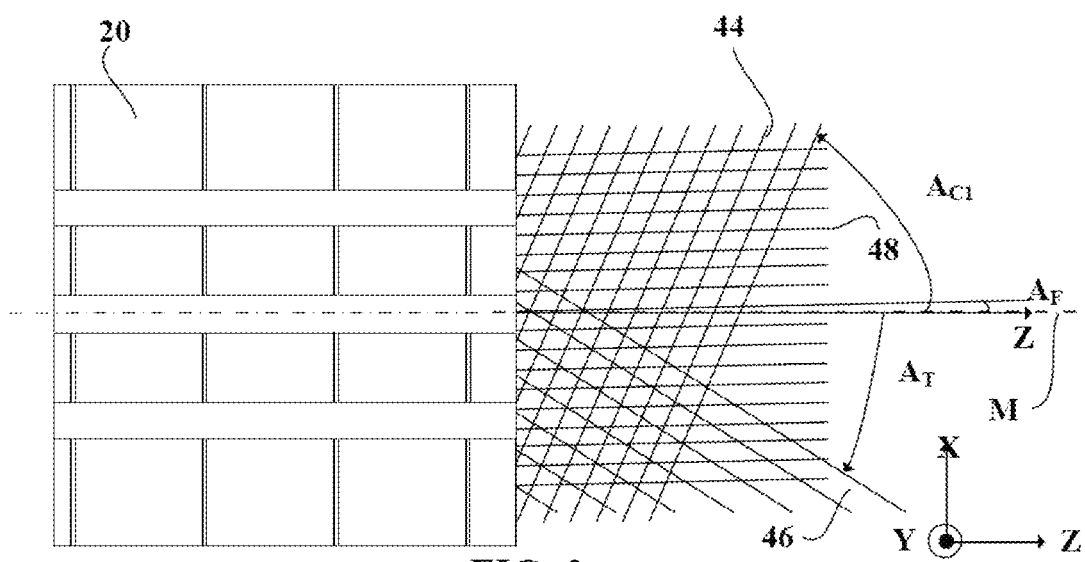
FIG. 2 is a cutaway view of the tyre in FIG. 1 illustrating the projection onto the equatorial circumferential plane E of the hooping reinforcing textile filamentary elements, of the working reinforcing filamentary elements and of the carcass reinforcing filamentary elements.

With reference to FIG. 2, the single carcass ply 34 comprises carcass reinforcing filamentary elements 44. Each carcass reinforcing filamentary element 44 makes an angle $A_{C1}$ greater than or equal to 55°, preferably ranging from 55° to 80° and more preferably from 60° to 70°, with the circumferential direction Z of the tyre 10 in the median plane M of the tyre 10, in other words in the crown 12.

Figure 3:
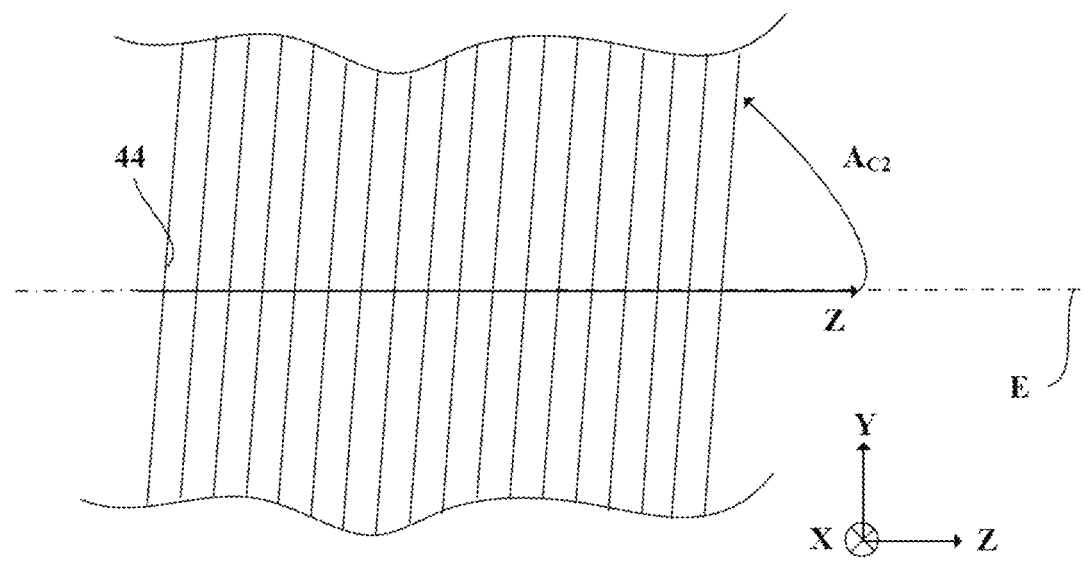
FIG. 3 is a view of the carcass reinforcing filamentary elements arranged in the sidewall of the tyre in FIG. 1 in projection onto the median plane M of the tyre.

With reference to FIG. 3, which is a simplified view in which, given the scale, all the carcass reinforcing filamentary elements 44 are shown parallel to one another, each carcass reinforcing filamentary element 44 makes an angle $A_{C2}$ greater than or equal to 85° with the circumferential direction Z of the tyre 10 in the equatorial circumferential plane E of the tyre 10, in other words in each sidewall 22.

In this example, it is adopted by convention that an angle oriented in the anticlockwise direction from the reference straight line, in this case the circumferential direction Z, has a positive sign and that an angle oriented in the clockwise direction from the reference straight line, in this case the circumferential direction Z, has a negative sign. In this instance, $A_{C1}=+67°$ and $A_{C2}=+90°$.

With reference to FIG. 2, the single working ply 18 comprises working reinforcing filamentary elements 46. Each working reinforcing filamentary element 46 makes an angle $A_T$ greater than or equal to 10°, preferably ranging from 30° to 50° and more preferably from 35° to 45°, with the circumferential direction Z of the tyre 10 in the median plane M. Given the above-defined orientation, $A_T=-40°$.

The single hooping ply 19 comprises at least one hooping reinforcing textile filamentary element 48. In this instance, the hooping ply 19 comprises a single hooping reinforcing textile filamentary element 48 wound continuously over an axial width $L_F$ of the crown 12 of the tyre 10. Advantageously, the axial width $L_F$ is less than the width $L_T$ of the working ply 18. The hooping reinforcing textile filamentary element 48 makes an angle $A_F$ strictly less than 10° with the circumferential direction Z of the tyre 10, preferably less than or equal to 7°, and more preferably less than or equal to 5°. In this instance, $A_F=+5°$.

The hooping ply has a secant modulus in tension equal to 261 daN/mm for a force equal to 15% of the force at break of the hooping ply. The force at break of the hooping ply is equal to 59 daN/mm.

Note that the carcass reinforcing filamentary elements 44, working reinforcing filamentary elements 46 and hooping reinforcing filamentary elements 48 are arranged, in the crown 12, so as to define, in projection onto the equatorial circumferential plane E, a triangle mesh. Here, the angle $A_F$ and the fact that the orientation of the angle $A_T$ and the orientation of the angle $A_{C1}$ are opposite with respect to the circumferential direction Z of the tyre 10 make it possible to obtain this triangle mesh.

Each carcass reinforcing filamentary element 44 conventionally comprises two multifilament strands, each multifilament strand being made up of a spun yarn of polyester, in this case PET, monofilaments, these two multifilament strands being individually overtwisted at 240 turns·m$^{-1}$ in one direction and then twisted together at 240 turns·m$^{-1}$ in the opposite direction. These two multifilament strands are wound in a helix around one another. Each of these multifilament strands has a count equal to 220 tex.

Each working reinforcing filamentary element 46 is an assembly of two steel monofilaments that each have a diameter equal to 0.30 mm, the two steel monofilaments being wound together at a pitch of 14 mm.

Figure 4:
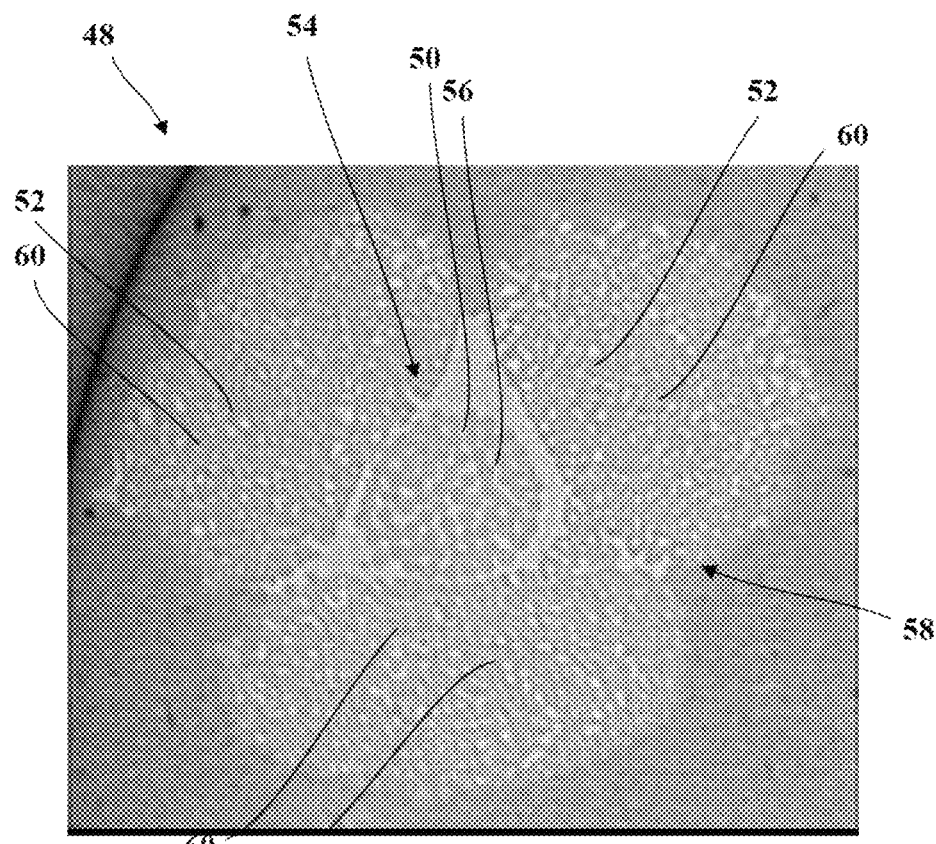
FIG. 4 is a photograph of a cross section perpendicular to the axis of a bonded hooping reinforcing textile filamentary element (assumed to be straight and at rest) of the tyre in FIG. 1.

The hooping reinforcing textile filamentary element 48, illustrated in FIG. 4, comprises at least one first strand 50 comprising at least one monofilament, in this instance a first multifilament strand comprising a plurality of monofilaments. The first strand has a secant modulus in tension at 1% elongation lower than or equal to 2500 cN/tex, preferably lower than or equal to 900 cN/tex and more preferably lower than or equal to 500 cN/tex. In this instance, the monofilaments of the first strand 50 are made of a material selected from polyesters, aliphatic polyamides, celluloses and mixtures of monofilaments of these materials, preferably made of a material selected from aliphatic polyamides and more preferably in this case made of nylon 6.6.

The hooping reinforcing textile filamentary element 48 likewise comprises at least one second strand 52 comprising at least one monofilament, in this instance a plurality of second multifilament strands each comprising a plurality of monofilaments. Each second strand 52 has a secant modulus in tension at 1% elongation higher than or equal to 500 cN/tex, preferably higher than or equal to 1000 cN/tex and more preferably higher than or equal to 2200 cN/tex. In this instance, the monofilaments of each second strand 52 are made of a material selected from aromatic polyamides, aromatic copolyamides, polyketones and mixtures of monofilaments of these materials, preferably made of a material selected from aromatic polyamides and more preferably in this case made of para-aramid.

The hooping reinforcing textile filamentary element 48 comprises a core 54 made up of a first strand 50 as described above. In other words, the core 54 comprises a single first strand 50, not two.

In the embodiment shown, the first multifilament strand 50 of the core 54 is made up of a single spun yarn 56 of a plurality of monofilaments made in this case of nylon 6.6. The count of the first strand 50 of the core 54 ranges from 10 tex to 100 tex, and in this case from 40 tex to 60 tex. In this instance, the first strand 50 of the core 54 is made up of a spun yarn having a count equal to 47 tex, known by the PHP Fibers company trade name Enka Nylon 4444HRT.

In a variant, it may be conceivable for the first strand of the core to comprise an assembly comprising a plurality of different spun yarns, that is to say at least to different spun yarns, of monofilaments made of a material selected from polyesters, aliphatic polyamides, celluloses and mixtures of monofilaments of these materials, preferably made of a material selected from aliphatic polyamides and more preferably made of nylon 6.6.

The hooping reinforcing textile filamentary element 48 likewise comprises a layer 58 comprising at least two second strands 52 as described above. Each second strand 52 of the layer 58 is wound in a helix around the core 54. The layer 58 is made up of three or four second strands 52, and in this case of three second strands 52.

In the embodiment shown, each second multifilament strand 52 of the layer 58 is made up of a single spun yarn 60 of monofilaments made in this case of para-aramid. The count of each second strand 52 of the layer 58 ranges from 50 tex to 350 tex, and in this case from 130 tex to 220 tex. In this instance, each second strand 52 of the layer 58 is made up of a spun yarn of para-aramid monofilaments having a count equal to 167 tex, known by the Teijin company trade name Twaron 1000.

In a variant, it may be conceivable for each second strand of the layer to comprise an assembly comprising a plurality of different spun yarns, that is to say at least two different spun yarns, of monofilaments made of a material selected from aromatic polyamides, aromatic copolyamides, polyketones and mixtures of monofilaments of these materials, preferably made of a material selected from aromatic polyamides and more preferably made of para-aramid.

The sum of the stiffnesses Sc in tension at 1% elongation of the second strands 52 is greater than the stiffness Sa in tension at 1% elongation of the first strand 50. In this instance, the stiffness in tension at 1% elongation of each second strand made of para-aramid is equal to 621 daN and the stiffness in tension at 1% elongation of the first strand made of nylon 6.6 is equal to 15 daN. So, Sc=3×621>Sa=15, preferably Sc/Sa≥10, more preferably Sc/Sa≥50 and even more preferably Sc/Sa≥100.

The ratio of the count of the first strand of the core to the sum of the counts of the second strands of the layer ranges from 0.05 to 0.15 and in this case is equal to 0.09.

Method for Manufacturing the Hooping Textile Filamentary Element

The bonded reinforcing textile filamentary element 48 is manufactured by implementing a manufacturing method comprising the following steps.

The method first of all comprises steps of assembling a reinforcing textile filamentary element in the natural state, in which the first strand 50 of the core 54 and the second strands 52 of the layer 58 are assembled so as to form a reinforcing textile filamentary element in the natural state.

In a step of twisting the first strand 50 of the core 54, a twist is applied to the first strand 50 with a number of turns per metre N1 in a first direction of twisting, for example the direction Z. In another step of twisting each second strand 52 of the layer 58, a twist is applied to each second strand 52 with a number of turns per metre N1' in the first direction of twisting Z.

Then, in a step of assembling the first strand 50 of the core 54 and the second strands 52 of the layer 58 by twisting, a twist is applied to the set of strands 50, 52 of the core and of the layer with a number of turns per metre N2 in a second direction of twisting opposite to the first direction of twisting, in this case the direction S.

N1, N1' and N2 are chosen such that the residual twist in the monofilaments of the first strand 50 of the core 54 and the residual twist in the monofilaments of each second strand 52 of the layer 58 is less than or equal to 10 turns·m$^{-1}$, preferably more or less zero. The choice of N1, N1', N2 thus depends on the count of each strand, on the number of second strands in the layer, but also on parameters of the manufacturing method, in particular the tensions $T_1$, $T_2$, respectively, of the first and second strands and/or the speeds $V_1$, $V_2$, respectively, of the first and second strands in the assembly device. Thus, N1>N1' and N2=N1'. Advantageously, 1.02≤N1/N1'≤1.15, and preferably 1.05≤N1/N1'≤1.10. Here, N1/N1'=1.08.

N1 ranges from 300 to 380 turns per metre, preferably from 320 to 360 turns per metre, and in this case N1=340 turns per metre. N1' ranges from 275 to 355 turns per metre, preferably from 295 to 335 turns per metre, and in this case N1'=315 turns per metre. N2 ranges from 275 to 355 turns per metre, preferably from 295 to 335 turns per metre, and in this case N2=315 turns per metre.

Thus, since the density of the nylon 6.6 is equal to 1.14 and the density of the para-aramid is equal to 1.44, the twist factor of the first strand 50 of the core 54 ranges from 60 to 80, preferably from 65 to 75, and in this case is equal to 69. The twist factor of each second strand 52 of the layer 58 ranges from 90 to 120, preferably from 100 to 115, and in this case is equal to 107.

Since the weighted density of the hooping reinforcing textile filamentary element 48 is equal to 1.41 and the weighted count of the hooping reinforcing textile filamentary element 48 is equal to 548 tex, the twist factor of the hooping reinforcing textile filamentary element 48 ranges from 170 to 220, preferably from 180 to 210, and in this case is equal to 196.

Before the assembly of the first and second strands 50, 52, the method comprises a feeding step, during which the first strand 50 and the second strands 52 are conveyed as far as an assembly point at which the first and second strands 50, 52 are assembled. The method advantageously comprises a closed-loop strand tension feedback step, during which:

a tension setpoint, known as "assembly tension setpoint", is defined, which is representative of a state of longitudinal tension that is desired to be obtained in each strand 50, 52 when each strand 50, 52 arrives at the assembly point, the tension known as "actual assembly tension" that is exerted within each strand 50, 52 is measured at a first tension measuring point situated along each strand 50, 52 and upstream of the assembly point with regard to the conveying direction of each strand 50, 52, and a tension feedback loop is used to determine an error, known as a "tension error", which corresponds to the difference between the assembly tension setpoint and the actual assembly tension of each strand 50, 52, on the basis of the tension error, a tension regulator member is actuated, which acts on each strand 50, 52 upstream of the assembly point so as to automatically converge, within each strand 50, 52, the actual assembly tension towards the assembly tension setpoint.

The installation for implementing this method may correspond to a ring loom that has been enhanced by adding in particular a tension feedback unit, or tension feedback units, thereto, allowing closed-loop feedback control of the tension in each strand 50, 52.

In practice, the installation comprises a feeding device designed so as to make it possible to unwind each strand 50, 52 from an input reel on which each strand 50, 52 is initially stored and feed it to the assembly point. The feeding device in question could advantageously comprise a motorized drive device situated upstream of the assembly point and designed to confer on each strand 50, 52 a speed known as the "forward speed" in response to a drive setpoint applied to the drive device. Thus, the motorized drive device makes it possible to drive each strand 50, 52 in a direction known as the "conveying direction" from the input reel to the assembly point. By convention, the conveying direction in which each strand 50, 52 moves from the input reel to the assembly point and beyond will be considered to correspond to an upstream-downstream direction of movement. The motorized drive device could comprise for example a spool or, alternatively, a three-roll feed system. Such a three-roll feed system comprises three rolls, namely a sun roll, which is preferably free, and two planet rolls, which are preferably motorized and synchronized, the rolls being arranged such that each strand 50, 52 is driven by friction between the rolls, along a path in the form of an Ω (capital omega). In this configuration intended to drive each strand 50, 52 in movement, the sun roll can preferably come into contact with the two planet rolls, and the cylindrical surface of the sun roll can be coated with a layer of non-slip rubber, in order to improve the driving of the sun roll by the planet rolls. Of course, the feeding device could comprise a plurality of separate motorized drive devices, which are each assigned to a different strand.

In one possible arrangement, also known per se within an installation of the "ring loom" type, the installation may have a guide eye, made for example of ceramic, intended to guide the textile filamentary element downstream of the assembly point, in this case directly downstream of the assembly point, and also a ring, which is coaxial with an output reel and on which a slider, which forms a passing point for the textile filamentary element situated downstream of the guide eye and upstream of the output reel, is mounted in a freely sliding manner.

Thus, when the output reel is driven in rotation about its, preferably vertical, axis by means of a motorized spindle, and thus exerts traction on the textile filamentary element, while the supply of strands is ensured by the feeding device, the slider carries out a relative movement in rotation about the output reel, this bringing about a twisting force on the textile filamentary element and thus causing the strands to be twisted at the assembly point, while guiding the gradual winding of the textile filamentary element onto the output reel. The ring is also made to move back and forth in translation along the axis of the output reel so as to distribute the turns of the textile filamentary element along the entire length of the output reel. Furthermore, the feeding device can preferably comprise a distributor designed to distribute the strands in space so as to arrange the geometric configuration in which the strands converge towards the assembly point situated downstream of, in this case directly downstream of, and more preferably just below, the distributor. The distributor may be in the form of a support plate that defines a plurality of passing points that are each intended to guide the strands coming from the input reels and/or the motorized drive devices.

The method comprises a strand tension feedback step. The tension in each strand 50, 52 corresponds to the longitudinal tensile force that is exerted within each strand 50, 52 at the point in question, and thus to the tensile stress that results from the application of this force. The tension feedback for each strand 50, 52 takes place in a closed loop. During the tension feedback step for each strand 50, 52:

a tension setpoint, known as "assembly tension setpoint" $T\_set$, is defined, which is representative of a state of longitudinal tension that is desired to be obtained in each strand 50, 52 when each strand 50, 52 arrives at the assembly point, the tension known as "actual assembly tension" $T\_actual$ that is exerted within each strand 50, 52 is measured at a first tension measuring point PT1 situated along each strand 50, 52 and upstream of the assembly point with regard to the conveying direction of each strand 50, 52, a tension feedback loop is used to determine an error, known as a "tension error" $ER\_T$, which corresponds to the difference between the assembly tension setpoint and the actual assembly tension of each strand 50, 52:

$$ER\_T = T\_set - T\_actual, \text{ and}$$

on the basis of the tension error $ER\_T$, a tension regulator member is actuated, which acts on each strand 50, 52 upstream of the assembly point so as to automatically converge, within each strand 50, 52, the actual assembly tension $T\_actual$ towards the assembly tension setpoint $T\_set$.

The installation therefore comprises a tension feedback unit, designed for closed-loop feedback control of the tension in the strand in question depending on an operating mode known as the "tension feedback mode", the tension feedback unit comprising to this end:

a member for setting a tension setpoint, which makes it possible to set a setpoint, known as "assembly tension setpoint" $T\_set$, which is representative of a state of longitudinal tension that is desired to be obtained in each strand 50, 52 when the strand arrives at the assembly point, a tension monitoring member, which measures the tension known as "actual assembly tension" $T\_actual$ that is exerted within each strand 50, 52, at a first tension measuring point PT1 situated along each strand 50, 52 and upstream of the assembly point with regard to the conveying direction of each strand 50, 52, a tension feedback member, which evaluates an error, known as a "tension error" $ER\_T$, which corresponds to the difference between the assembly tension setpoint $T\_set$ and the actual assembly tension $T\_actual$ of each strand 50, 52, and a tension regulator member, which is dependent on the tension feedback member and which acts on each strand 50, 52 upstream of the assembly point so as to automatically converge, within each strand 50, 52, the actual assembly tension $T\_actual$ towards the assembly tension setpoint $T\_set$.

Of course, different assembly tension setpoints $T\_set$ could be set for each strand 50, 52, and separate regulation of each strand 50, 52, independently of the other strands, could be ensured.

Furthermore, during the feeding step, each strand 50, 52 is preferably, as mentioned above, moved towards the assembly point by means of a motorized drive device, such as a spool, which is situated upstream of the assembly point and is designed to confer on each strand 50, 52 a speed known as the "forward speed" $V\_fwd$ in response to a drive setpoint applied to the motorized drive device. Preferably, the first tension measuring point PT1 is then chosen, where the actual assembly tension $T\_actual$ is measured, such that said first tension measuring point PT1 is situated in a portion of each strand 50, 52, known as the "approach portion", which extends from the motorized drive device, upstream, to the assembly point, downstream. Thus, advantageously, the actual assembly tension $T\_actual$ is measured at a measuring point PT1 that is contained between the position (considered along the path taken by the strand in question) of the motorized drive device and the position (considered along the path taken by the strand in question) of the assembly point, and which is thus particularly close to the assembly point. More particularly, the tension measuring point PT1 that is thus chosen can therefore be situated between the assembly point and the last driving element, in this case the motorized drive device, which precedes the assembly point, in the upstream-downstream conveying direction of the strand in question. The actual assembly tension T_actual is therefore measured preferably downstream of the last motorized device (in this case the motorized drive device) that is able to act actively on the strand in question and to significantly modify the tension therein before the strand in question arrives at the assembly point. Consequently, the measurement of the actual assembly tension T_actual, which is carried out as close as possible to the assembly point, in an approach portion that is disturbed little by external forces, is particularly reliable, and representative of the tension that is actually exerted in the strand in question at the time the strand reaches the assembly point.

According to a preferred feature, during the strand tension feedback step, the motorized drive device, in particular the motorized drive device associated with the strand in question, will preferably be used as the tension regulator member, by adjusting, depending on the tension error ER_T, the drive setpoint applied to the motorized drive device. Advantageously, the use of a motorized device makes it possible, depending on the tension error ER_T measured, either to slow down the strand in question, upstream of the assembly point, by applying a sufficiently reduced forward speed V_fwd to the strand in question, by way of the motorized device, this having the effect of retaining the strand in question and thus increasing the tension in question, or, by contrast, to accelerate the strand in question, upstream of the assembly point, that is to say to increase the forward speed V_fwd of the strand in question, this having the effect of reducing the tension in the strand in question, "slackening" the strand in question.

Advantageously, just as many, mutually independent, regulations of tension could thus be carried out simultaneously and simply on each strand 50, 52.

According to another preferred feature, if, during the feeding step, the strand in question, for example the first strand 50, is moved towards the assembly point by means of a motorized drive device, such as a spool, which is situated upstream of the assembly point, in particular as was described above, then the method can also comprise an unwinding step, during which the strand in question, in this case for example the first strand 50, is unwound from an input reel, by means of an unwinding device that is separate from the motorized drive device for the strand in question and is situated upstream of said motorized drive device. The unwinding device comprises a motorized reel holder intended to receive and drive the input reel in question in rotation at a selected speed known as the "input reel speed" ω7. Advantageously, it is then possible to measure, at a second tension measuring point PT2 that is situated along the strand in question, in this case for example along the first strand 50, between the motorized reel holder and the motorized drive device, the tension known as actual "unwinding tension" T_unwind_actual that is exerted in the strand in question, and consequently to adjust the input reel speed ω7 so as to converge said actual unwinding tension T_unwind_actual towards a predetermined unwinding tension setpoint T_unwind_set. Specifically, by controlling on one side, upstream, the input reel speed ω7, and thus the unwinding speed at which the strand is released, and on the other side, downstream, it is advantageously possible to choose the unwinding tension of the strand, which prevails between the unwinding device, upstream, and the motorized drive device, downstream. Advantageously, a well-controlled actual unwinding tension T_unwind_actual is thus provided for the strand in question, which is present at the input of the motorized drive device, this setting a first pretension level, on the basis of which it will then be possible, by virtue of the action of the motorized drive device, to modify the state of tension in the strand in the approach portion, downstream of the motorized drive device and upstream of the assembly point, in order to confer the desired actual assembly tension T_actual on said strand. In this regard, it was found that the creation and maintenance, by virtue of double motorization (that of the unwinding device and that of the motorized drive device), of a tension preload, in the form of an actual unwinding tension T_unwind_actual with a regular and well-controlled value, advantageously made it possible to adjust the actual assembly tension T_actual of the strand in question more precisely and more easily. Note in particular that the existence of a first tension level, equal to the actual unwinding tension T_unwind_actual, makes it possible, by way of an additive action (increase in the tension by braking the strand) or, by contrast, by way of a subtractive action (reduction in the tension by accelerating the strand) exerted by the motorized drive device on the basis of this first level, to precisely achieve a resultant actual assembly tension T_actual, which forms a second tension level, and which will be freely chosen from a very wide range of actual assembly tensions, the lower limit of which is lower (in terms of absolute value) than the first tension level, that is to say than the actual unwinding tension T_unwind_actual, and the upper limit of which is higher than said first tension level. More particularly, the existence of a first tension level makes it possible to reduce, in the second tension level, the assembly tension (both the setpoint and the actual assembly tension) T_set, T_actual to a very low level, for example a few centinewtons (equivalent to the weight of a mass of a few grams) or a few tens of centinewtons (equivalent to the weight of a mass of a few tens of grams), without risking creating tension jolts in the strand, and without risking causing the actual assembly tension T_actual to pass through a value of zero, which would risk causing the strand to depart from the guides (pulleys, rollers, etc.) that define the path of the strand through the installation. In particular, such a method having two tension levels, using two tension measuring points PT1, PT2 situated upstream of the assembly point, on one and the same strand and at a distance from one another, makes it possible in particular to obtain effective regulation in an assembly tension range of between T_actual=5 cN (five centinewtons) and T_actual=100 cN (one hundred centinewtons), which would be achieved by "subtraction" from the first tension level. By way of example, it may be possible to choose, for the first tension level, an unwinding tension T_unwind_set (and thus obtain an actual unwinding tension T_unwind_actual) of between 50 cN (fifty centinewtons) and 600 cN, and for example equal to 100 cN, to 200 cN, or to 400 cN, and obtain, at the second tension level, a precise and stable assembly tension T_actual, which will be perfectly in accordance with a setpoint T_set that will have been freely chosen from a very wide possible range, between 15 cN (fifteen centinewtons, corresponding to a mass of around 15 grams) and 100 N (one hundred newtons, corresponding to a mass of around ten kilograms), or between 5 cN (five centinewtons, corresponding to a mass of around 5 grams) and 200 N (two hundred newtons, corresponding to a mass of around twenty kilograms).

According to a preferred feature, the installation comprises a forward-speed feedback unit, designed for closed-loop feedback control of the forward speed V_fwd of each strand depending on an operating mode known as the "speed feedback mode", the speed feedback unit comprising to this end:

- a member for setting a speed setpoint, which makes it possible to set a setpoint, known as "forward speed setpoint" V_fwd_set, which corresponds to a value of a forward speed that is desired to be conferred on each strand upstream of the assembly point,
- a speed monitoring member which measures, at a forward-speed measuring point PV1 situated along each strand and upstream of the assembly point, a speed value known as the "actual forward speed" V_fwd_actual, which is representative of the actual forward speed of each strand at the measuring point PV1 in question,
- a speed feedback member, which evaluates an error, known as a "speed error" ER_V, which corresponds to the difference between the forward speed setpoint and the actual forward speed of each strand: ER_V=V_fwd_set−V_fwd_actual, and
- a speed regulator member, which is dependent on the speed feedback member and which acts on each strand upstream of the assembly point so as to automatically converge the actual forward speed V_fwd_actual of each strand towards the forward speed setpoint V_fwd_set.

The installation can thus preferably have a selector, which makes it possible to selectively activate, for each strand, the tension feedback mode or the speed feedback mode. In other words, the user is provided with a selection possibility, for each strand, between a tension feedback mode for each strand, and a forward speed feedback mode for each strand. The method could thus provide a corresponding selection step. In this case, it is possible to realize multiple assembly combinations, within which each strand is regulated in terms of tension, or several strands are regulated in terms of tension, while another strand, or several other strands, are regulated in terms of speed.

Note, furthermore, that the speed feedback, and in particular the measurement of the actual forward speed V_fwd_actual of the strand in question, occurs preferably close to the assembly point, and for example in the approach portion, contained between the last motorized element that precedes the assembly point and the assembly point, in order that the forward speed in question, which is under feedback control, is representative of the forward speed at which the strand arrives at the assembly point. Preferably, the speed measuring point PV1 could be situated at the motorized drive device.

For given counts and twists, it is possible to vary the force-elongation curve of the textile filamentary element, and thus in particular its tangent modulus, by varying the tension T1 or the speed V1 applied to the core during the assembly step in its manufacturing method. In this instance, by increasing the tension $T_1$ compared with $T_2$ or by decreasing the speed $V_1$ compared with the speed $V_2$, the tangent modulus is reduced for all of the elongations, the elongation at break is increased and the force at break of the textile filamentary element is reduced. By contrast, by lowering the tension $T_1$ compared with $T_2$ or by increasing the speed $V_1$ compared with the speed $V_2$, the tangent modulus is increased for all of the elongations, the elongation at break is reduced and the force at break of the textile filamentary element is increased. In addition to varying the tangent modulus, the increase in the tension $T_1$ compared with $T_2$ or the decrease in the speed $V_1$ compared with $V_2$ makes it possible to improve the endurance of the textile filamentary element, as is demonstrated in the endurance test described below. In this instance, the speed $V_1$ applied to the first strand 50 of the core 54 is equal to 9.3 m/min. The speed $V_2$ applied to each second strand 52 of the layer 58 is equal to 10.55 m/min. The tension applied to the textile filamentary element 48 in the natural state during the assembly state is equal to 1200 cN.

Following the assembly steps described above, the reinforcing filamentary element in the natural state is obtained. The manufacturing method then comprises a step in which the reinforcing textile filamentary element in the natural state is coated with an intermediate layer of a first heat-crosslinkable adhesive composition. In this instance, use is made of a first adhesive composition have an adhesive primer function and comprising an epoxy resin in aqueous solution, for example based on polyglycerol polyglycidyl ether. The method then comprises a first thermal treatment step for the reinforcing textile filamentary element in the natural state coated with the intermediate layer so as to crosslink the first adhesive composition. A pre-bonded reinforcing textile filamentary element is then obtained.

Next, the method comprises a second step of coating the pre-bonded reinforcing textile filamentary element with an external layer of a second heat-crosslinkable adhesive composition. In this instance, use is made of a conventional aqueous adhesive composition of the RFL type (resorcinol-formaldehyde-latex of elastomer(s)). Next, the method comprises a second thermal treatment step for the pre-bonded reinforcing textile filamentary element coated with the external layer so as to crosslink the second adhesive composition. A bonded reinforcing textile filamentary element is then obtained.

For the bonded reinforcing textile filamentary element 48, during the first step of coating with and thermal treatment of the reinforcing element in the natural state coated with the intermediate layer, a tension $T_{T1}$ that in this case is equal to 0.2 daN is applied to the reinforcing element in the natural state coated with the intermediate layer. During the second step of coating with and thermal treatment of the pre-bonded reinforcing element coated with the external layer, a tension $T_{T2}$ that is greater than a standard pretension on the textile filamentary element and in this case is equal to 0.2 daN is applied to the pre-bonded reinforcing element coated with the external layer.

During the second thermal treatment step, a treatment tension $T_{T2}$ is applied such that $T_{T2}/Ta \geq 3$ cN/tex. In this case, with Ta being equal to 47 tex, $T_{T2}/Ta=3.19$ cN/tex. The tension $T_{T2}$ is such that $T_{T2}/Tc \leq 10$ cN/tex, preferably $T_{T2}/Tc \leq 7$ cN/tex, more preferably $T_{T2}/Tc \leq 5$ cN/tex and even more preferably $T_{T2}/Tc \leq 4$ cN/tex. In this case, with Tc being equal to 501 tex, $T_{T2}/Tc=0.3$ cN/tex.

Figure 5:
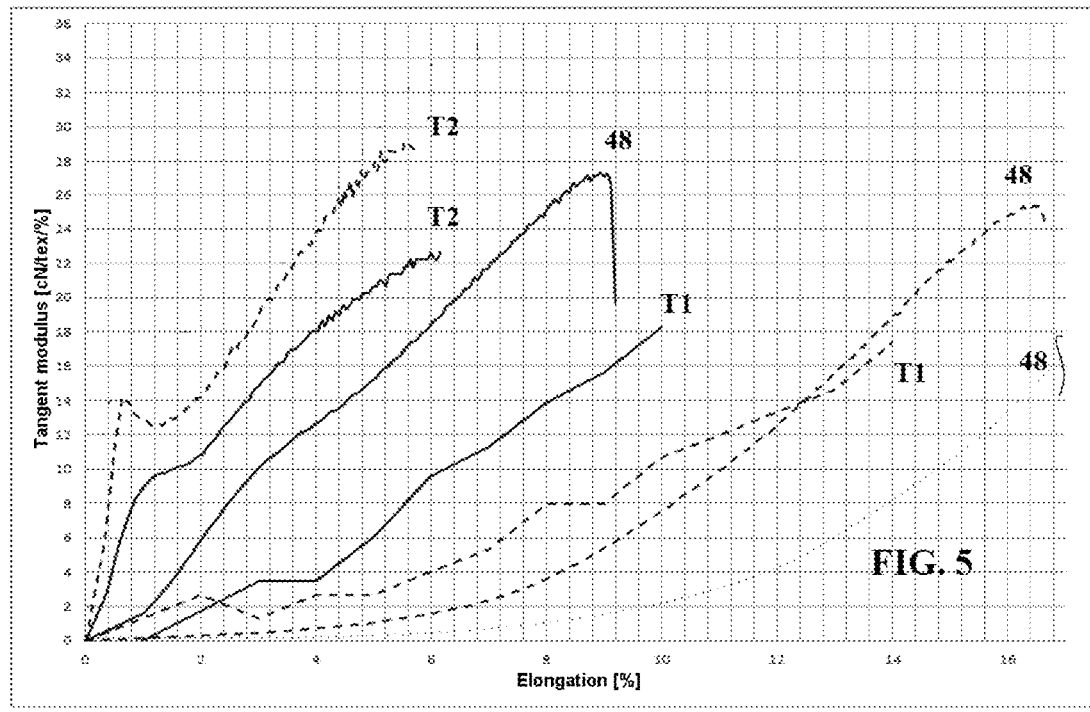
FIG. 5 is a graph showing the variation in the tangent moduli of bonded hooping reinforcing textile filamentary elements of tyres according to the invention and of the prior art.

A hybrid textile filamentary element from U.S. Pat. No. 6,799,618 and denoted by the reference T1, a conventional hybrid textile filamentary element T2 from WO2016/166056 and the textile filamentary element 48 described above were compared. The tangent modulus of each of these bonded textile filamentary elements was measured before the step of manufacturing the hooping ply (dashed-line curves) and once removed from the tyre (solid-line curves). The tangent modulus of the textile filamentary element in the natural state 48 was likewise measured (dotted-line curve). The variation in the tangent moduli of these textile filamentary elements is shown in FIG. 5.

With reference to the dashed-line curves, note that the bonded textile filamentary element 48 has, in contrast to the textile filamentary element T2, a tangent modulus lower than or equal to 3 cN/tex/% for any elongation less than or equal to 2%. In this instance, the bonded textile filamentary element 48 has a tangent modulus lower than or equal to 3 cN/tex/% for any elongation less than or equal to 6% and even less than or equal to 7%.

Note likewise that the bonded textile filamentary element 48 has a tangent modulus lower than or equal to 5 cN/tex/% for any elongation less than or equal to 3%. In this instance, the bonded textile filamentary element 48 has a tangent modulus lower than or equal to 7.5 cN/tex/% for any elongation less than or equal to 8.5%.

Moreover, note that the bonded textile filamentary element 48 has a tangent modulus lower than or equal to 10 cN/tex/% for any elongation less than or equal to 5%. In this instance, the bonded textile filamentary element 48 has a tangent modulus lower than or equal to 10 cN/tex/% for any elongation less than or equal to 10%, or even less than or equal to 11%.

Moreover, note that the bonded textile filamentary element 48 has a tangent modulus lower than or equal to 15 cN/tex/% for any elongation less than or equal to 6%. In this instance, the bonded textile filamentary element 48 has a tangent modulus lower than or equal to 15 cN/tex/% for any elongation less than or equal to 12%.

By contrast, the textile filamentary element T2 has a tangent modulus lower than or equal to 5 cN/tex/% for elongations only less than or equal to 0.1%. Beyond 0.1% elongation, the tangent modulus of the textile filamentary element T2 is higher than 5 cN/tex/%.

In addition, the tangent modulus of the textile filamentary element T2, while it exceeds 10 cN/tex/% for any elongation greater than or equal to 0.2%, has no significance for any elongation greater than or equal to 6%, which is the value of the elongation at break of the textile filamentary element T2. The bonded textile filamentary element 48 has a much higher elongation at break, in this case greater than or equal to 10%, in this instance, greater than or equal to 14%, or even greater than or equal to 15%, or even greater than or equal to 16%, and in this case equal to 16.5%.

With reference to the solid-line curves, note that, once removed from the tyre, the textile filamentary element 48 has a tangent modulus higher than or equal to 5 cN/tex/% for any elongation greater than or equal to 4%, or even greater than or equal to 3.5%, or even greater than or equal to 3% and, in the example described, greater than or equal to 2%. The textile filamentary element T1, once removed from the tyre, has a tangent modulus higher than 5 cN/tex/% for elongations only greater than 4.5%.

Note that, once removed from the tyre, the textile filamentary element 48 has a tangent modulus higher than or equal to 10 cN/tex/% for any elongation greater than or equal to 6%, or even greater than or equal to 5%, or even greater than or equal to 4% in the example described. By contrast, the textile filamentary element T1, once removed from the tyre, has a tangent modulus higher than or equal to 10 cN/tex/% for elongations only greater than 6.3%.

The textile filamentary element 48, once removed from the tyre, has a tangent modulus higher than or equal to 15 cN/tex/% for any elongation greater than or equal to 8%, or even greater than or equal to 7% and, in the example described, greater than or equal to 6%. By contrast, the textile filamentary element T1, once removed from the tyre, has a tangent modulus higher than or equal to 15 cN/tex/% for elongations only greater than 8.6%.

The textile filamentary element 48, once removed from the tyre, has a tangent modulus higher than or equal to 20 cN/tex/% for any elongation greater than or equal to 8%. The tangent modulus of the textile filamentary element T1, once removed from the tyre, never reaches the value of 20 cN/tex/%.

Finally, note that, once removed from the tyre, the textile filamentary element 48 has an elongation at break greater than or equal to 6%, preferably greater than or equal to 7% and more preferably greater than or equal to 8%. The textile filamentary element T2 has a much lower elongation at break, in this case equal to 6%.

From these curves, it can be seen that the textile filamentary element 48 has high mechanical strength properties once removed from the tyre, in particular a tangent modulus that is significantly higher than that of T1, and relatively close to that of T2, or even higher for elongations greater than the elongation at break of T2. It can also be seen that the bonded textile filamentary element 48 has a relatively low tangent modulus, in this case significantly lower than that of T2 and lower than that of T1 up to elongations less than 12%, allowing easy radial and circumferential deformations of the tyre while it is being manufactured.

In accordance with the invention, the steps of coating with and of thermally treating the external layer of the pre-bonded reinforcing textile filamentary element are carried out such that, for an elongation equal to 30% of the elongation at break of the reinforcing textile filamentary element in the natural state, in this case for an elongation equal to 30% of 19%, that is to say 5.7%, the tangent modulus of the bonded reinforcing textile filamentary element 48, in this case equal to 1.5 cN/tex/%, is increased compared with the tangent modulus of the reinforcing textile filamentary element in the natural state, in this case equal to 0.5 cN/tex/%.

In this instance, the steps of coating with and of thermally treating the external layer of the pre-bonded reinforcing element are carried out such that, for any elongation greater than or equal to 30% of the elongation at break of the reinforcing textile filamentary element in the natural state, the tangent modulus of the bonded reinforcing textile filamentary element 48 is increased compared with the tangent modulus of the reinforcing textile filamentary element in the natural state, corresponding to an identical elongation.

Preferably, the steps of coating with and of thermally treating the external layer of the pre-bonded reinforcing element are carried out such that, for an elongation equal to 20% of the elongation at break of the reinforcing textile filamentary element in the natural state, in this case for an elongation equal to 20% of 19%, that is to say 3.8%, the tangent modulus of the bonded reinforcing textile filamentary element 48, in this case equal to 0.75 cN/tex/%, is increased compared with the tangent modulus of the reinforcing textile filamentary element in the natural state, in this case equal to 0.25 cN/tex/%. In this instance, the steps of coating with and of thermally treating the external layer of the reinforcing element in the natural state or pre-bonded reinforcing element are carried out such that, for any elongation greater than or equal to 20% of the elongation at break of the reinforcing textile filamentary element in the natural state, the tangent modulus of the bonded reinforcing textile filamentary element 48 is increased compared with the tangent modulus of the reinforcing textile filamentary element in the natural state, corresponding to an identical elongation.

The steps of coating with and of thermally treating the external layer of the pre-bonded reinforcing element are carried out so as to increase the tangent modulus at 6%, 4% and 2% elongation of the bonded reinforcing textile filamentary element compared with the tangent modulus at 6%, 4% and 2% elongation, respectively, of the reinforcing textile filamentary element in the natural state. In this instance, the steps of coating with and of thermally treating the external layer of the pre-bonded reinforcing element are carried out such that, for any elongation ranging from 6%, 4% and 2% to the elongation at break of the reinforcing textile filamentary element in the natural state, the tangent modulus of the bonded reinforcing textile filamentary element 48 is increased compared with the tangent modulus of the reinforcing textile filamentary element in the natural state, corresponding to an identical elongation.

Method for Manufacturing the Tyre

The tyre 10 is manufactured using the below-described method.

First of all, the working ply 18 and the carcass ply 34 are manufactured by arranging the reinforcing textile filamentary elements of each ply parallel to one another and embedding them, for example by skimming, in an uncrosslinked composition comprising at least one elastomer, the composition being intended to form an elastomeric matrix once crosslinked. A ply known as a straight ply is obtained, in which the reinforcing textile filamentary elements of the ply are parallel to one another and are parallel to the main direction of the ply. Then, if necessary, portions of each straight ply are cut at a cutting angle and these portions are butted together so as to obtain what is known as an angled ply, in which the reinforcing textile filamentary elements of the ply are parallel to one another and form an angle with the main direction of the ply equal to the cutting angle.

Then, an assembly method as described in EP1623819 or in FR1413102 is implemented.

During this assembly method, the hoop reinforcement 17, in this case the hooping ply 19, is arranged radially on the outside of the working reinforcement 16. In this instance, in a first variant, a strip with a width B significantly less than $L_F$ is manufactured, wherein the bonded reinforcing textile filamentary element 48 is embedded in an uncrosslinked composition and the strip is wound helically through several turns so as to obtain the axial width $L_F$. In a second variant, the hooping ply 19 having a width $L_F$ is manufactured in a similar manner to the carcass and working plies and the hooping ply 19 is wound through one turn over the working reinforcement 16. In a third variant, the bonded reinforcing textile filamentary element 48 is wound radially on the outside of the working ply 18, and then a layer of a composition is deposited on top, in which the hooping reinforcing textile filamentary element 48 will be embedded during the curing of the tyre. In the three variants, the bonded reinforcing textile filamentary element 48 is embedded in a composition in order to form, at the end of the method for manufacturing the tyre, the hooping ply 19 comprising the hooping reinforcing textile filamentary element 48.

After a step of laying the tread 20, the tyre is then obtained, in which the compositions of the elastomeric matrices are not yet crosslinked and are in an uncured state. This is what is known as a green form of the tyre.

Finally, the compositions are crosslinked, for example by curing or vulcanization, in order to obtain the tyre in which the compositions are in a crosslinked state. During this curing step, the tyre of which the elastomeric matrices are in the uncured state is expanded radially, circumferentially and axially, for example by pressurizing an inflating membrane, so as to press the tyre against the surfaces of a curing mould. This radial and circumferential expansion is in this case advantageously implemented by virtue of the bonded reinforcing textile filamentary elements of the first and second embodiments, and, in a more limited manner, by employing the bonded reinforcing textile filamentary elements of the third and fourth embodiments.

Comparative Tests

The compression fatigue strength, in other words the endurance under compression, of the conventional hybrid textile filamentary elements T2 of WO2016/166056 and of bonded textile filamentary elements A1, B1, C1, A2 and C2 similar to the textile filamentary element 48 described above and all in accordance with the invention was tested.

The bonded textile filamentary elements A1, B1, C1, A2 and C2 are structurally identical to the bonded textile filamentary element 48 but are obtained by implementing different manufacturing methods in which the speed $V_2$ of each second strand 54 of the layer 58 is respectively equal to 10.3 m·min$^{-1}$, 10.5 m·min$^{-1}$, 10.2 m·min$^{-1}$ for each textile filamentary element in the natural state A, B and C and the speed $V_1$ of the first strand 50 of the core 54 is equal to 9.3 m·min$^{-1}$. The tension applied to each textile filamentary element in the natural state A and B during the assembly step is equal to 1100 cN and equal to 550 cN for the textile filamentary element in the natural state C.

The tension $T_{T1}$ is equal to 0.15 daN for all the bonded reinforcing textile filamentary elements A1, B1, C1, A2 and C2. The tension $T_{T2}$ is equal to 0.15 daN for each bonded reinforcing textile filamentary element A1 and C1. The tension $T_{T2}$ is equal to 1 daN for all each bonded reinforcing textile filamentary element A2, B1 and C2.

Figure 6:
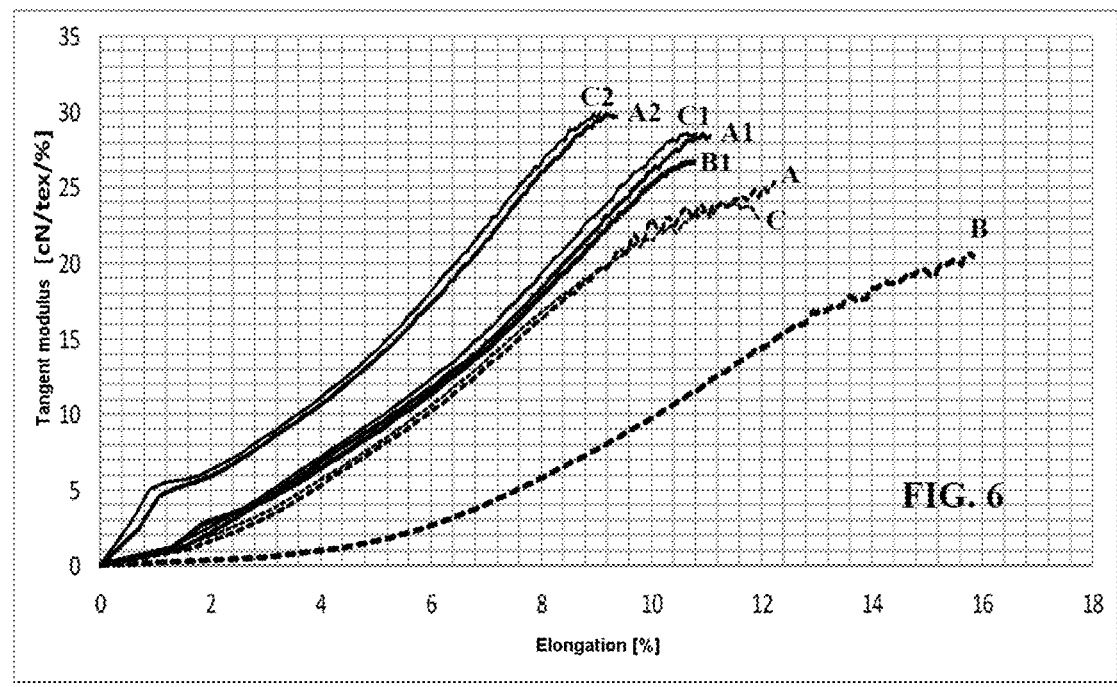
FIG. 6 is a graph showing the variation in the tangent moduli of hooping reinforcing textile filamentary elements in the natural state manufactured employing the method according to the invention.

The tangent modulus of each of these bonded textile filamentary elements was measured and the variation in the tangent moduli of these bonded textile filamentary elements is shown in FIG. 6 (solid-line curves).

The tangent modulus of the textile filamentary elements in the natural state A, B, C that allowed the manufacture of each of these bonded textile filamentary elements was also measured (dashed-line curves). The textile filamentary element in the natural state A allowed the manufacture of the bonded textile filamentary elements A1 and A2 by implementing the method according to the invention with the above-described parameters. The textile filamentary element in the natural state B allowed the manufacture of the bonded textile filamentary element B1 by implementing the method according to the invention with the above-described parameters. The textile filamentary element in the natural state C allowed the manufacture of the bonded textile filamentary elements C1 and C2 by implementing the method according to the invention with the above-described parameters.

Each reinforcing textile filamentary element in the natural state A and C has a tangent modulus lower than or equal to 3 cN/tex/% for any elongation less than or equal to 2%. The reinforcing textile filamentary element in the natural state B has a tangent modulus lower than or equal to 3 cN/tex/% for any elongation less than or equal to 6%. Each reinforcing textile filamentary element in the natural state A and C has a tangent modulus lower than or equal to 5 cN/tex/% for any elongation less than or equal to 3%. The reinforcing textile filamentary element in the natural state B has a tangent modulus lower than or equal to 5 cN/tex/% for any elongation less than or equal to 7.5%. Each reinforcing textile filamentary element in the natural state A and C has a tangent modulus lower than or equal to 10 cN/tex/% for any elongation less than or equal to 5%. The reinforcing textile filamentary element in the natural state B has a tangent modulus lower than or equal to 10 cN/tex/% for any elongation less than or equal to 10%. Each reinforcing textile filamentary element in the natural state A and C has a tangent modulus lower than or equal to 15 cN/tex/% for any elongation less than or equal to 6%. The reinforcing textile filamentary element in the natural state B has a tangent modulus lower than or equal to 15 cN/tex/% for any elongation less than or equal to 12%.

Each bonded reinforcing textile filamentary element A1, B1 and C1 has a tangent modulus lower than or equal to 3 cN/tex/% for any elongation less than or equal to 2%. Each bonded reinforcing textile filamentary element A1, B1 and C1 has a tangent modulus lower than or equal to 5 cN/tex/% for any elongation less than or equal to 3%. Each bonded reinforcing textile filamentary element A1, B1 and C1 has a tangent modulus lower than or equal to 10 cN/tex/% for any elongation less than or equal to 5%. Each bonded reinforcing textile filamentary element A1, B1 and C1 has a tangent modulus lower than or equal to 15 cN/tex/% for any elongation less than or equal to 6%. Each bonded reinforcing textile filamentary element A1, B1 and C1 has an elongation at break greater than or equal to 10%.

Each bonded reinforcing textile filamentary element A1, B1 and C1 has a tangent modulus higher than or equal to 3 cN/tex/% for any elongation greater than or equal to 3%. Each bonded reinforcing textile filamentary element A1, B1 and C1 has a tangent modulus higher than or equal to 5 cN/tex/% for any elongation greater than or equal to 4.5%. Each bonded reinforcing textile filamentary element A1, B1 and C1 has a tangent modulus higher than or equal to 10 cN/tex/% for any elongation greater than or equal to 7%. Each bonded reinforcing textile filamentary element A1, B1 and C1 has a tangent modulus higher than or equal to 15 cN/tex/% for any elongation greater than or equal to 9%. Each bonded reinforcing textile filamentary element A1, B1 and C1 has an elongation at break less than or equal to 11%.

Each bonded reinforcing textile filamentary element A2, C2 has a tangent modulus higher than or equal to 3 cN/tex/% for any elongation greater than or equal to 2%. Each bonded reinforcing textile filamentary element A2, C2 has a tangent modulus higher than or equal to 5 cN/tex/% for any elongation greater than or equal to 3%. Each bonded reinforcing textile filamentary element A2, C2 has a tangent modulus higher than or equal to 10 cN/tex/% for any elongation greater than or equal to 5%. Each bonded reinforcing textile filamentary element A2, C2 has a tangent modulus higher than or equal to 15 cN/tex/% for any elongation greater than or equal to 6%. Each bonded reinforcing textile filamentary element A2, C2 has an elongation at break less than or equal to 10%.

Each bonded reinforcing textile filamentary element A2, C2 has a tangent modulus lower than or equal to 3 cN/tex/% for any elongation less than or equal to 0.5%. Each bonded reinforcing textile filamentary element A2, C2 has a tangent modulus lower than or equal to 5 cN/tex/% for any elongation less than or equal to 0.75%. Each bonded reinforcing textile filamentary element A2, C2 has a tangent modulus lower than or equal to 10 cN/tex/% for any elongation less than or equal to 3%. Each bonded reinforcing textile filamentary element A2, C2 has a tangent modulus lower than or equal to 15 cN/tex/% for any elongation less than or equal to 4.5%. Each bonded reinforcing textile filamentary element A2, C2 has an elongation at break ranging from 8% to 10%.

During the method, the steps of coating with and of thermally treating the external layer of each pre-bonded reinforcing textile filamentary element are carried out such that, for an elongation equal to 30% of the elongation at break of each reinforcing textile filamentary element in the natural state A, B, C, in this case for an elongation equal to 4% for each reinforcing textile filamentary element in the natural state A and C and equal to 5.3% for the reinforcing textile filamentary element in the natural state B, the tangent modulus of the bonded reinforcing textile filamentary element A1, B1, C2, A2, C2 is increased compared with the tangent modulus of the reinforcing textile filamentary element in the natural state A, B, C. In this instance, the tangent modulus passes from 5.5 cN/tex/% for each reinforcing textile filamentary element in the natural state A and C to 7 cN/tex/% for each bonded reinforcing textile filamentary element A1 and C1 or to 10.5-11 cN/tex/% for each bonded reinforcing textile filamentary element A2 and C2. In this instance, the tangent modulus passes from 2 cN/tex/% for the reinforcing textile filamentary element in the natural state B to 10 cN/tex/% for the bonded reinforcing textile filamentary element B1. Moreover, the steps of coating with and of thermally treating the external layer of each pre-bonded reinforcing element are carried out such that, for any elongation greater than or equal to 30% of the elongation at break of each reinforcing textile filamentary element in the natural state A, B, C, the tangent modulus of each bonded reinforcing textile filamentary element A1, B1, C2, A2, C2 is increased compared with the tangent modulus of the reinforcing textile filamentary element in the natural state A, B, C, corresponding to an identical elongation.

During the method, the steps of coating with and of thermally treating the external layer of each pre-bonded reinforcing textile filamentary element are carried out such that, for an elongation equal to 20% of the elongation at break of each reinforcing textile filamentary element in the natural state A, B, C, in this case for an elongation equal to 2.4% for each reinforcing textile filamentary element in the natural state A and C and equal to 3.2% for the reinforcing textile filamentary element in the natural state B, the tangent modulus of the bonded reinforcing textile filamentary element A1, B1, C2, A2, C2 is increased compared with the tangent modulus of the reinforcing textile filamentary element in the natural state A, B, C. In this instance, the tangent modulus passes from 2.5 cN/tex/% for each reinforcing textile filamentary element in the natural state A and C to 3.5 cN/tex/% for each bonded reinforcing textile filamentary element A1 and C1 or to 7.5 cN/tex/% for each bonded reinforcing textile filamentary element A2 and C2. In this instance, the tangent modulus passes from 0.75 cN/tex/% for the reinforcing textile filamentary element in the natural state B to 5 cN/tex/% for the bonded reinforcing textile filamentary element B1. Moreover, the steps of coating with and of thermally treating the external layer of each pre-bonded reinforcing element are carried out such that, for any elongation greater than or equal to 20% of the elongation at break of each reinforcing textile filamentary element in the natural state A, B, C, the tangent modulus of each bonded reinforcing textile filamentary element A1, B1, C2, A2, C2 is increased compared with the tangent modulus of the reinforcing textile filamentary element in the natural state A, B, C, corresponding to an identical elongation.

In the embodiments illustrated, each bonded reinforcing textile filamentary element A1, B1, C2, A2, C2 has an elongation at break greater than or equal to 6% and each reinforcing textile filamentary element in the natural state A, B, C has an elongation at break greater than or equal to 6%. The steps of coating with and of thermally treating the external layer of each pre-bonded reinforcing element are carried out so as to increase the tangent modulus at 6%, 4% and 2% elongation of each bonded reinforcing textile filamentary element A1, B1, C2, A2, C2 compared with the tangent modulus at, respectively, 6%, 4% and 2% elongation of each reinforcing textile filamentary element in the natural state A, B, C. In this instance, the steps of coating with and of thermally treating the external layer of the pre-bonded reinforcing element are carried out such that, for each elongation ranging from 2% to the elongation at break of each reinforcing textile filamentary element in the natural state A, B, C, the tangent modulus of each bonded reinforcing textile filamentary element A1, B1, C2, A2, C2 is increased compared with the tangent modulus of each reinforcing textile filamentary element in the natural state A, B, C, corresponding to an identical elongation.

For textile filamentary elements intended to reinforce tyres, the fatigue strength can be analysed by subjecting these textile filamentary elements to various known laboratory tests, in particular the fatigue test known as the "belt" test, sometimes known as the "shoe shine test", in which the textile filamentary elements, previously coated with adhesive, are incorporated into an elastomeric article. The principle of the "belt" test is as follows: the belt comprises two layers of textile filamentary elements, the first layer comprising the textile filamentary elements of which the performance is intended to be evaluated embedded at a pitch of 1.25 mm in two skims of composition of 0.4 mm each, and a second stiffening layer for avoiding the elongation of the first layer, this second layer comprising relatively stiff textile filamentary elements and comprising two strands of aramid of 167 tex each that are twisted together at a twist of 315 turns per metre and are embedded at a pitch of 0.9 mm in two skims of composition of 0.3 mm each. The axis of each textile filamentary element is oriented in the longitudinal direction of the belt.

Next, this belt is subjected to the following stress loadings: the belt is driven cyclically, with the aid of a rod-crank system, around a wheel of given diameter, in this case 15 mm, such that the first layer comprising the textile filamentary elements of which the performance is intended to be evaluated is in contact with the wheel and each elementary portion of the belt is subjected to a tension of 15 daN and undergoes cycles of variation in curvature which cause it to flex from an infinite radius of curvature to a given radius of curvature, specifically for 190 000 cycles at a frequency of 7 Hz. This variation in curvature of the belt causes the textile filamentary elements of the inner layer, which is closest to the wheel, to experience a given geometric compression ratio depending on the chosen wheel diameter. At the end of these stress loadings, the textile filamentary elements are stripped from the inner layer and the residual breaking strength Frr of the fatigued textile filamentary elements is measured. Beforehand, the initial force at break Fri was measured, this value corresponding to the force of a textile filamentary element removed from a new, unstressed belt. The decline D of the textile filamentary elements is then calculated using the formula D=100×(1−Frr/Fri). Thus, the closer D is to 100, the lower the endurance under compression of the textile filamentary element. By contrast, the closer D is to 0, the higher the endurance under compression of the textile filamentary element.

The results are collated in Table 1 below:

TABLE 1

|    | $V_1$ | $V_2$ | $T_{T1}$ | $T_{T2}$ | Decline D |
|----|-------|-------|----------|----------|-----------|
| T2 | /     | /     | /        | /        | 100       |
| A1 | 9.3   | 10.3  | 0.15     | 0.15     | 50        |
| A2 | 9.3   | 10.3  | 0.15     | 1        | 50        |
| B1 | 9.3   | 10.5  | 0.15     | 1        | 34        |
| C1 | 9.3   | 10.2  | 0.15     | 0.15     | 55        |
| C2 | 9.3   | 10.2  | 0.15     | 1        | 53        |

From studying table 1, it will be noted that the bonded reinforcing textile filamentary elements A1 and A2 have the same endurance while having significantly different tangent moduli. The same effect is observed for the bonded reinforcing textile filamentary elements C1 and C2. The bonded reinforcing textile filamentary elements A1, A2, C1 and C2 have comparable endurances. It has thus been demonstrated here that endurance is dependent only on the reinforcing textile filamentary element in the natural state. This is because the bonded reinforcing textile filamentary elements A1, A2, C1 and C2 originate from reinforcing filamentary elements in the natural state A and C that have virtually identical variations in tangent moduli and come from methods according to the invention that use different tensions $T_{T2}$ between the bonded reinforcing textile filamentary elements A1, C1, for the one part, and A2, C2, for the other part.

It will likewise be noted that, among the bonded reinforcing textile filamentary elements A1, A2, C1, C2 and B1, the one having the best endurance is the bonded reinforcing textile filamentary element B1. It will also be noted that the variations in tangent moduli of the bonded reinforcing textile filamentary elements A1, B1 and C1 are virtually identical. Thus, it has been demonstrated here that the lower the tangent modulus of the reinforcing textile filamentary element in the natural state over great elongations, the better the endurance of the bonded reinforcing textile filamentary element obtained.

Thus, the method according to the invention makes it possible to manufacture a bonded reinforcing textile filamentary element having a maximum endurance and a maximum modulus, the endurance and the modulus being able to be adjusted independently of one another.

The invention claimed is:

1. A method for manufacturing a bonded reinforcing textile filamentary element, the bonded reinforcing textile filamentary element including (i) a core made up of a first strand comprising at least one monofilament, and (ii) a layer comprising at least two second strands, each second strand of the layer comprising at least one monofilament, and each second strand of the layer being wound in a helix around the core, the method comprising:
   assembling the first strand of the core and the second strands of the layer to form a reinforcing textile filamentary element in a natural state;
   coating the reinforcing textile filamentary element in the natural state with an external layer of at least one heat-crosslinkable adhesive composition to form a coated reinforcing textile filamentary element;
   thermally treating the coated reinforcing textile filamentary element to crosslink the adhesive composition to obtain the bonded reinforcing textile filamentary element; and
   applying, during the step of thermally treating the external layer, a treatment tension $T_{T2}$ to the coated reinforcing textile filamentary element, the treatment tension $T_{T2}$ being greater than a standard pretension, wherein the steps of coating and of thermally treating are carried out such that, for an elongation equal to 30% of an elongation at break of the reinforcing textile filamentary element in the natural state, a tangent modulus of the bonded reinforcing textile filamentary element is increased as compared to a tangent modulus of the reinforcing textile filamentary element in the natural state.

2. The method according to claim 1, further comprising:
prior to the coating with an external layer step, coating the reinforcing textile filamentary element in the natural state with an intermediate layer of a first heat-crosslinkable adhesive composition;
thermally treating the reinforcing textile filamentary element in the natural state that is coated with the intermediate layer to crosslink the first adhesive composition to obtain a pre-bonded reinforcing textile filamentary element;
as the coating with an external layer step, coating the pre-bonded reinforcing textile filamentary element with an external layer of a second heat-crosslinkable adhesive composition to form the coated reinforcing textile filamentary element.

3. The method according to claim 1, wherein, with the core having a count Ta, the tangent modulus of the bonded reinforcing textile filamentary element is increased by applying the treatment tension $T_{T2}$, the treatment tension $T_{T2}$ such that $T_{T2}/Ta \geq 3$ cN/tex.

4. The method according to claim 1, wherein, with the layer having a count Tc, the tangent modulus of the bonded reinforcing textile filamentary element is increased by applying the treatment tension $T_{T2}$, the treatment tension $T_{T2}$ such that $T_{T2}/Tc \leq 10$ cN/tex.

5. The method according to claim 1, wherein the treatment tension $T_{T2}$ is applied to the coated reinforcing textile filamentary element such that, for an elongation equal to 20% of the elongation at break of the reinforcing textile filamentary element in the natural state, the tangent modulus of the bonded reinforcing textile filamentary element is increased as compared to the tangent modulus of the reinforcing textile filamentary element in the natural state.

6. The method according to claim 1, wherein, with the bonded reinforcing textile filamentary element having an elongation at break greater than or equal to 6% and the reinforcing textile filamentary element in the natural state having an elongation at break greater than or equal to 6%, the treatment tension $T_{T2}$ is applied to the coated reinforcing textile filamentary element such that the tangent modulus at 6% elongation of the bonded reinforcing textile filamentary element is increased as compared to the tangent modulus at 6% elongation of the reinforcing textile filamentary element in the natural state.

7. The method according to claim 1, wherein, with the bonded reinforcing textile filamentary element having an elongation at break greater than or equal to 4% and the reinforcing textile filamentary element in the natural state having an elongation at break greater than or equal to 4%, the treatment tension $T_{T2}$ is applied to the coated reinforcing textile filamentary element such that the tangent modulus at 4% elongation of the bonded reinforcing textile filamentary element is increased compared with the tangent modulus at 4% elongation of the reinforcing textile filamentary element in the natural state.

8. The method according to claim 1, wherein, with the bonded reinforcing textile filamentary element having an elongation at break greater than or equal to 2% and the reinforcing textile filamentary element in the natural state having an elongation at break greater than or equal to 2%, the treatment tension $T_{T2}$ is applied to the coated reinforcing textile filamentary element such that the tangent modulus at 2% elongation of the bonded reinforcing textile filamentary element is increased as compared to the tangent modulus at 2% elongation of the reinforcing textile filamentary element in the natural state.

9. The method according to claim 1, wherein the at least one monofilament of the first strand comprises a material selected from the group consisting of polyesters, aliphatic polyamides, and mixtures thereof.

10. The method according to claim 1, wherein the at least one monofilament of each second strand comprises a material selected from the group consisting of aromatic polyamides, aromatic copolyamides, polyketones and mixtures thereof.

11. A method for manufacturing a tire comprises:
manufacturing a bonded reinforcing textile filamentary element according to claim 1;
manufacturing a ply, during which the bonded reinforcing textile filamentary element is embedded in a composition; and
curing a green form of the tire comprising the ply so as to obtain the tire.

12. A bonded reinforcing textile filamentary element obtained by the method according to claim 1.

13. A tire comprising a bonded reinforcing textile filamentary element according to claim 12.

* * * * *